United States Patent
Shiraki

(10) Patent No.: US 12,082,736 B2
(45) Date of Patent: Sep. 10, 2024

(54) AUTOMATIC DISH SERVING SYSTEM, A RESTAURANT, AN AUTOMATIC SYSTEM FOR A RESTAURANT, AN AUTOMATIC DISH SERVING METHOD, A PROGRAM AND A STORAGE MEDIUM

(71) Applicant: TECHMAGIC INC., Tokyo (JP)

(72) Inventor: Yuji Shiraki, Tokyo (JP)

(73) Assignee: TECHMAGIC INC., Tokyo (JP)

(*) Notice: Subject to any disclaimer, the term of this patent is extended or adjusted under 35 U.S.C. 154(b) by 919 days.

(21) Appl. No.: 17/258,733

(22) PCT Filed: Feb. 4, 2020

(86) PCT No.: PCT/JP2020/005916
§ 371 (c)(1),
(2) Date: Jan. 7, 2021

(87) PCT Pub. No.: WO2020/166723
PCT Pub. Date: Aug. 20, 2020

(65) Prior Publication Data
US 2021/0321813 A1    Oct. 21, 2021

(30) Foreign Application Priority Data

Feb. 14, 2019 (JP) ................................ 2019-024031
Oct. 15, 2019 (JP) ................................ 2019-189047
Jan. 31, 2020 (JP) ................................ 2020-015906

(51) Int. Cl.
*A47J 27/18* (2006.01)
*A47J 27/086* (2006.01)
(Continued)

(52) U.S. Cl.
CPC ............. *A47J 27/18* (2013.01); *A47J 27/086* (2013.01); *A47J 36/32* (2013.01);
(Continued)

(58) Field of Classification Search
CPC .......... A47J 27/18; A47J 27/086; A47J 36/32; A47J 36/165; A47J 2027/006; G06Q 50/12
(Continued)

(56) References Cited

U.S. PATENT DOCUMENTS 4,732,080 A * 3/1988 Vita ....................... A47J 27/18
                                                            99/410
4,979,435 A   12/1990 Hayashi
(Continued)

FOREIGN PATENT DOCUMENTS

CN        103720345 A    4/2014
CN        104510327 A    4/2015
(Continued)

OTHER PUBLICATIONS

Japanese Notice of Refusal dated Sep. 7, 2021 as received in application No. 2020-572356.

Primary Examiner — Omar Flores Sanchez
(74) Attorney, Agent, or Firm — Maschoff Brennan

(57) ABSTRACT

An automatic dish serving system can be applied to various dishes to save space and achieve automation. An automatic dish serving system capable of cooking multiple types of dishes according to a customer's order includes a boiler for boiling noodles and a heating device adjacent to the boiler for heating a cooking container. A supplying device supplies to the cooking container an ingredient to be added to the noodles. A moving device is capable of moving the cooking utensil and can move the cooking container to at least a position at which an ingredient is supplied from the supplying device, a position at which a cooking container is heated by the heating device, and a position at which boiled noodles are received from the boiler. The heating device can heat and cook an ingredient that is supplied from the supplying device to the cooking container according to the order.

10 Claims, 11 Drawing Sheets

(51) Int. Cl.
*A47J 36/32* (2006.01)
*A47J 27/00* (2006.01)
*A47J 36/16* (2006.01)
*G06Q 50/12* (2012.01)

(52) U.S. Cl.
CPC ........ *A47J 2027/006* (2013.01); *A47J 36/165* (2013.01); *G06Q 50/12* (2013.01)

(58) Field of Classification Search
USPC .......................................................... 99/325
See application file for complete search history.

(56) References Cited

U.S. PATENT DOCUMENTS

| | | | | |
|---|---|---|---|---|
| 5,590,586 | A * | 1/1997 | Ulfig | A47J 27/14 219/214 |
| 5,947,012 | A * | 9/1999 | Ewald | H05B 3/286 99/468 |
| 10,881,121 | B2 * | 1/2021 | Su | A47J 37/043 |
| 2017/0206733 | A1 | 7/2017 | Yu | |

FOREIGN PATENT DOCUMENTS

| | | |
|---|---|---|
| CN | 106264100 A | 1/2017 |
| JP | S61-125781 A | 6/1986 |
| JP | 60-186259 | 9/1987 |
| JP | H01-281567 A | 11/1989 |
| JP | 06-153839 | 6/1994 |
| JP | 07-24626 | 1/1995 |
| JP | 07-227354 | 8/1995 |
| JP | 2000-135166 A | 5/2000 |
| JP | 2007-233995 | 9/2007 |
| JP | 4531832 | 8/2010 |
| JP | 2017-130186 A | 7/2017 |
| JP | 2017-136281 A | 8/2017 |
| KR | 10-1993-0011427 | 12/1993 |

* cited by examiner

TABLEWARE WASHING MACHINE

PUTTING THE TABLEWARE IN A RACK

TREATING LEFTOVER FOOD AND PRE-WASHING

PICKING UP USED TABLEWARE

61

60

64

62

64  63

65

AUTOMATIC DISH SERVING SYSTEM, A RESTAURANT, AN AUTOMATIC SYSTEM FOR A RESTAURANT, AN AUTOMATIC DISH SERVING METHOD, A PROGRAM AND A STORAGE MEDIUM

TECHNICAL FIELD

The present invention relates to an automatic dish serving system, a restaurant, an automatic system for a restaurant, an automatic dish serving method, a program, and a storage medium that automatically serve dishes including noodle dishes according to a customer's order.

BACKGROUND ART

In recent years, due to the shortage of employees in restaurants, there has been a demand for automating service processes in restaurants. In cooking system of noodle dishes, there is also a demand for automation, and techniques such as those described in Patent Literatures 1 to 6 have been conventionally proposed.

Patent Literature 1 discloses a noodle cooking device for serving hot buckwheat noodles, hot udon noodles, cold buckwheat noodles, or cold udon noodles by the following process. In the first process, buckwheat noodles or udon noodles produced by a buckwheat noodle making machine or udon noodle making machine are boiled in a boiling water tank while moving in an annular path in a water-permeable storage container. In the next process, the buckwheat noodles or udon noodles are processed in a cold/hot water noodle processing device while moving in an annular path inside a water receiving groove. In the next process, the buckwheat noodles or udon noodles are transferred to a sales container. Further, in the next process, cold soup is poured from a cold soup supplying device or hot soup is poured from a hot soup supplying device into the sales container containing buckwheat noodles or udon noodles. In the final process, the sales container is sent to an outlet.

Patent Literature 2 discloses an automatic noodle cooking device. In the automatic noodle cooking device, in the first process, ramen noodles in a basket are boiled by moving the basket in an annular path in a boiling pot at a boiling part. In the next process, in a finishing part having an annular path, ramen soup is supplied to a container, and then, noodles are put from the basket into the container, and then, toppings such as roast pork are put into the container, and then, spices are put into the container, and finally, the container is sent from the finishing part to an automatic delivery conveyor.

Patent Literature 3 discloses an automatic cooking machine for ramen, champon and the like. In the automatic cooking machine, noodles, which are supplied from a raw noodle feeder and boiled in a boiling pot device, soup, toppings and spices are added to a container that moves linearly on a transporting conveyor, and finally, the container is fed onto a receiving table.

Patent Literature 4 discloses an automatic cooking device for boiled noodles such as Japanese buckwheat noodles, udon noodles and Chinese buckwheat noodles. In the automatic cooking device, a tableware is placed on a conveyor-shaped food transporting box. Into this tableware, soup, then ingredients that are previously placed in a closed container in a refrigerator, and then noodles that are heated in advance in a heating device and are placed in a closed container in a worming device are placed. Finally, a customer takes out the dish with the tableware from an outlet.

Patent Literature 5 discloses a pasta cooking system. The pasta cooking system comprises a cooking tank for boiling pasta, a heating means for heating water in a tank, a means for adding water to the tank, a high water level detecting means, and a control means that responds to the high water level detecting means and maintains the water level between high water level and full water level when the water level becomes full during pasta cooking.

Patent Literature 6 discloses a cooking assist robot that stirs cooking ingredients in a cooking container with an arm having a height distribution measuring unit.

CITATION LIST

Patent Literature

[Patent Literature 1] Japanese Examined Application No. 07-24626
[Patent Literature 2] Japanese Patent Laid-Open No. 60-186259
[Patent Literature 3] Japanese Patent Laid-Open No. 07-227354
[Patent Literature 4] Japanese Patent Laid-Open No. 2007-233995
[Patent Literature 5] Japanese Patent Laid-Open No. 06-153839
[Patent Literature 6] Japanese Patent No. 4531832

SUMMARY OF INVENTION

Technical Problem

The noodle cooking device described in Patent Literature 1 is limited to cooking of simply boiling buckwheat noodles or udon noodles and pouring cold or hot soup, and there is no heat-cooking device for boiled noodles or ingredients. Further, there is no specific disclosure regarding the cooking of noodles other than buckwheat noodles or udon noodles. Furthermore, in the noodle cooking device described in Patent Literature 1, each device requires a large installation area because buckwheat noodles, udon noodles, a water-permeable storage container or a sales container is each moved along an annular circulation path in each device. Further, in the noodle cooking device described in Patent Literature 1, a customer's order is performed using a reception card, which corresponds to noodles selected from multiple selection switches provided in the noodle cooking device. The reception card is required to receive the dish.

The automatic noodle cooking device described in Patent Literature 2 includes a step of boiling ramen and a step of adding soup, toppings such as roast pork, and spices to the ramen. However, there is no heat-cooking device for boiled noodles or ingredients, and there is no specific disclosure regarding the cooking of noodles other than ramen. Further, in the automatic noodle cooking device described in Patent Literature 2, each device requires a large installation area because the ramen is moved along an annular circulation path in each device. Further, in the automatic noodle cooking device described in Patent Literature 2, the method of taking an order from a customer is not disclosed.

In the automatic cooking machine described in Patent Literature 3, there is no heat-cooking device for boiled noodles and ingredients, and types of noodles that can be cooked are limited. Although ramen and champon are exemplified, there is no specific disclosure regarding the cooking of ingredients thereof. Further, in the automatic cooking machine described in Patent Literature 3, since ingredients are sequentially put into the container that moves linearly on the transporting conveyor, a large installation area is required. Furthermore, in the automatic cooking machine described in Patent Literature 3, the method of taking an order from a customer is not disclosed.

In the automatic cooking device described in Patent Literature 4, it is described that noodles put in a large number of closed containers are heat-cooked at once, but the automatic cooking device is not used for subsequent cooking of noodles and cooking of ingredients, and the types of noodles that can be cooked are limited. Further, in the automatic cooking device described in Patent Literature 4, since the noodles and ingredients previously each placed in the closed container are sequentially put into the container that moves linearly on the transporting conveyor, a large installation area and installation space for the closed container are required. Furthermore, the automatic cooking device described in Patent Literature 4 is a vending machine, and money is put into the vending machine to give a sales command for the vending machine.

The pasta cooking system described in Patent Literature 5 is a system that saves labor in the work of boiling pasta, but there is no heat-cooking device for boiled noodles and ingredients. Further, in the pasta cooking system described in Patent Literature 5, the method of taking an order from a customer is not disclosed.

The cooking assist robot described in Patent Literature 6 only stirs the cooking ingredients in the cooking container. Thus, it is not possible to automate the cooking of dishes. Further, in the cooking assist robot described in Patent Literature 5, the method of taking an order from a customer is not disclosed.

Therefore, an object of the present invention is to provide an automatic dish serving system, a restaurant, an automatic system for a restaurant, an automatic dish serving method, a program, and a storage medium, which can be applied to various dishes and can save space and can achieve automation.

Solution to Problem

The above object of the present invention can be achieved by the following configurations. That is to say, an automatic dish serving system of the first aspect of the present invention capable of cooking multiple types of dishes according to a customer's order is characterized in that the system comprises:
a noodle heating device capable of heating noodles according to the order;
a heating device for heating a cooking container;
an ingredient supplying device for supplying an ingredient to the cooking container; and a moving device capable of moving the cooking utensil, and
the moving device can move the cooking container to at least a position at which an ingredient is supplied from the ingredient supplying device, a position at which a cooking container is heated by the heating device, and a position at which heated noodles are received from the noodle heating device, and
the heating device can at least heat and cook an ingredient that is supplied from the supplying device to the cooking container according to the order.

An automatic dish serving system of the second aspect of the present invention is characterized in that, the automatic dish serving system of the first aspect further includes at least one device of (2-1) a serving container supplying device for storing a serving container and supplying the serving container to a dish up position,
(2-2) a dish delivering device for delivering a dish, in which food is dished up on a serving container, to a customer,
(2-3) a cooking container washing device for washing a cooking container after use,
(2-4) a serving container washing device for washing a serving container after use,
(2-5) a used serving container transporting device for collecting a serving container after use from a customer and transporting the serving container after use to a serving container washing device,
(2-6) a washed serving container transporting device for transporting a serving container after wash from a serving container washing device for washing a serving container after use to a serving container supplying device for storing a serving container and supplying the serving container to a dish up position,
(2-7) a noodle supplying device for supplying noodles to a device capable of heating noodles,
(2-8) a noodle supplying device for, from multiple types of noodles, supplying noodles according to the order to a boiler, and
(2-9) a non-heated state noodle supplying device for supplying non-heated state noodles that doesn't pass through a heating device to a cooking container.

An automatic dish serving system of the third aspect of the present invention is characterized in that, in the automatic dish serving system of the second aspect, at least one of
a means for dishing up food on the serving container of the (2-1),
a means for transporting the cooking container to the cooking container washing device of the (2-3), or
a means for taking out the cooking container from the cooking container washing device of the (2-3)
is the moving device.

An automatic dish serving system of the fourth aspect of the present invention is characterized in that, in the automatic dish serving system of the second or third aspect, at least any two of the dish delivering device of the (2-2), the used serving container transporting device of the (2-5) or the washed serving container transporting device of the (2-6) can be commonly used.

An automatic dish serving system of the fifth aspect of the present invention is characterized in that, in the automatic dish serving system of any of the first to fourth aspects, the moving device can move the cooking container to at least a position at which an ingredient is supplied from the supplying device, a position at which a cooking container is heated by the heating device, a position at which heated noodles are received from the noodle heating device, a position of a dish up device or a position at which the cooking container is washed.

An automatic dish serving system of the sixth aspect of the present invention is characterized in that, in the automatic dish serving system of any of the first to fifth aspects, the moving device is composed of a plurality of movable cooking container gripping devices, the cooking container gripping devices can at least grip and move a cooking container and adjust the posture of a cooking container, and the plurality of cooking container gripping devices can cooperate to move a plurality of cooking containers to desired positions.

An automatic dish serving system of the seventh aspect of the present invention is characterized in that, in the automatic dish serving system of any of the first to sixth aspects, the noodle heating device and/or the heating device can cook a plurality of dishes at the same time.

An automatic dish serving system of the eighth aspect of the present invention is characterized in that, in the automatic dish serving system of any of the first to seventh aspects, the system includes a noodle supplying device for automatically supplying noodles to the noodle heating means, the noodle supplying device includes at least a noodle storing means for storing noodles at desired temperature, a noodle taking out means for taking out a predetermined amount of noodles from the noodle storing means, and a noodle transporting means for transporting noodles that is taken out by the noodle taking out means to a predetermined position in the noodle heating means.

An automatic dish serving system of the nineth aspect of the present invention is characterized in that, in the automatic dish serving system of any of the first to eighth aspects, the noodle supplying device takes out a predetermined amount of predetermined noodles from multiple types of noodles according to a customer's order and automatically supplies the noodles to the noodle heating means.

An automatic dish serving system of the tenth aspect of the present invention is characterized in that, in the automatic dish serving system of any of the first to nineth aspects, the heating device includes an electromagnetic heating means and can heat a cooking container while rotating the cooking container in a predetermined posture and can stir an ingredient in the cooking container.

An automatic dish serving system of the eleventh aspect of the present invention is characterized in that, in the automatic dish serving system of any of the first to tenth aspects, an ingredient supplying device stores multiple types of ingredients and automatically supplies, from multiple types of ingredients, a predetermined amount of a predetermined ingredient to a cooking container according to a customer's order.

An automatic dish serving system of the twelfth aspect of the present invention is characterized in that, in the automatic dish serving system of any of the first to eleventh aspects, a customer's order can be accepted by at least one of (12-1) accepting an order interactively,
(12-2) accepting an order of customized menus,
(12-3) accepting an order from a wireless communication terminal,
(12-4) accepting an order from a dedicated terminal,
(12-5) accepting an order by voice recognition, or
(12-6) accepting an order by image recognition.

An automatic dish serving system of the thirteenth aspect of the present invention is characterized in that, in the automatic dish serving system of any of the first to twelfth aspects, the system can cook dishes other than noodle dishes.

An automatic dish serving system of the fourteenth aspect of the present invention is characterized in that, in the automatic dish serving system of any of the first to thirteenth aspects, the system is further provided with another cooking device.

A restaurant of the fifteenth aspect of the present invention is characterized to be provided with the automatic dish serving system of any one of the first to fourteenth aspects.

A restaurant of the sixteenth aspect of the present invention is characterized in that, in the restaurant of the fifteenth aspect, at least one of (16-1) automatically grasping seat availability in the restaurant,
(16-2) being able to check vacant seats by a customer even remotely,
(16-3) being able to reserve seats by a customer even remotely,
(16-4) being able to order a menu by a customer even remotely,
(16-5) automatically serving a dish to a customer,
(16-6) being able to pay a fee from a customer's terminal,
(16-7) automatically delivering a dish,
(16-8) automatically collecting a serving container after use,
(16-9) automatically washing a serving container after use,
(16-9) automatically refilling a serving container after wash,
(16-10) automatically washing a cooking container after use,
(16-11) automatically guiding a customer to a seat in the restaurant,
(16-12) automatically serving a dish to a customer,
(16-13) automatically predicting an order from a customer,
(16-14) automatically ordering for purchasing ingredients, or
(16-15) automatically refilling delivered ingredients to the supplying device can be performed in the restaurant.

An automatic system for a restaurant of the seventeenth aspect of the present invention is characterized in that, in an automatic system for a restaurant that automatically cooks a dish to be served according to a customer's order, at least one of (17-1) automatically grasping seat availability in the restaurant,
(17-2) being able to check vacant seats by a customer even remotely,
(17-3) being able to reserve seats by a customer even remotely,
(17-4) being able to order a menu by a customer even remotely,
(17-5) automatically serving a dish to a customer,
(17-6) being able to pay a fee from a customer's terminal,
(17-7) automatically delivering a dish,
(17-8) automatically collecting a serving container after use,
(17-9) automatically washing a serving container after use,
(17-9) automatically refilling a serving container after wash,
(17-10) automatically washing a cooking container after use,
(17-11) automatically guiding a customer to a seat in the restaurant,
(17-12) automatically serving a dish to a customer,
(17-13) automatically predicting an order from a customer,
(17-14) automatically ordering for purchasing ingredients, or
(17-15) automatically refilling delivered ingredients to the supplying device can be performed.

An automatic dish serving system of the eighteenth aspect of the present invention is characterized in that, in the automatic dish serving system of any of the first to fourteenth aspects, the system includes at least a noodle supplying device, a cooking container moving device and a noodle heating device, the noodle supplying device automatically supplies noodles to a noodle heating means and includes a noodle storing means for storing noodles at desired temperature, a noodle taking out means for taking out a predetermined amount of noodles from the noodle storing means, and a noodle transporting means for transporting noodles that is taken out by the noodle taking out means to a predetermined position in a noodle heating means, the noodle supplying device takes out a predetermined amount of predetermined noodles from multiple types of noodles according to a customer's order and automatically supplies the noodles to the noodle heating means, the cooking container moving device includes at least one movable cooking container gripping device and moves a cooking container provided with a convex portion on the outer circumference, the cooking container gripping device can grip the convex portion of a cooking container, move the cooking container, and adjust the posture of the cooking container, and the noodle heating device for heating noodles in a basket and taking out heated noodles to a container heats noodles in a basket, lifts a basket containing heated noodles, places a container at a predetermined position that is below the lifted basket and above a position at which noodles are heated, and tilts the lifted basket to move noodles in the basket to a container.

An automatic noodle supplying device of the nineteenth aspect of the present invention is characterized in that the automatic noodle supplying device is a noodle supplying device for automatically supplying noodles to a noodle heating means and includes a noodle storing means for storing noodles at desired temperature, a noodle taking out means for taking out a predetermined amount of noodles from the noodle storing means, and a noodle transporting means for transporting noodles that is taken out by the noodle taking out means to a predetermined position in a noodle heating means.

An automatic noodle supplying device of the twentieth aspect of the present invention is characterized in that, in the automatic noodle supplying device of the nineteenth aspect, the automatic noodle supplying device takes out a predetermined amount of predetermined noodles from multiple types of noodles according to a customer's order and automatically supplies the noodles to the noodle heating means.

A cooking container moving device of the twenty-first aspect of the present invention is characterized in that the cooking container moving device includes at least one movable cooking container gripping device, moves a cooking container provided with a convex portion on the outer circumference, can grip the convex portion of a cooking container and move the cooking container, and can adjust the posture of the cooking container.

A noodle heating device of the twenty-second aspect of the present invention is characterized in that the noodle heating device, which is used for heating noodles in a basket and taking out heated noodles to a container, heats noodles in a basket, lifts a basket containing heated noodles, places a container at a predetermined position that is below the lifted basket and above a position at which noodles are heated, and tilts the lifted basket to move noodles in the basket to a container.

An automatic dish serving method of the twenty-third aspect of the present invention is a cooking method capable of cooking multiple types of dishes according to a customer's order and is characterized in that the method comprises the steps of:

heating noodles according to the order with a noodle heating device;

heating a cooking container with a heating device;

supplying an ingredient to the cooking container with an ingredient supplying device; and moving the cooking container with a moving device, and the moving device can move the cooking container to at least a position at which an ingredient is supplied from the ingredient supplying device, a position at which a cooking container is heated by the heating device, or a position at which heated noodles are received from the noodle heating device, the heating device can at least heat and cook an ingredient that is supplied from the supplying device to the cooking container according to the order.

A program of the twenty-fourth aspect of the present invention is characterized in that the program operates at least one step or means in the automatic dish serving method of the twenty-third aspect with a computer.

A storage medium of the twenty-fifth aspect of the present invention is characterized in that the storage medium stores the program of the twenty-third aspect.

Advantageous Effects of Invention

According to embodiments of the present invention, an automatic dish serving system, a restaurant, an automatic system for a restaurant, an automatic dish serving method, a program and a storage medium that can be applied to various dishes, can save space and can achieve automation can be provided.

BRIEF DESCRIPTION OF DRAWINGS

FIG. 8 is an explanatory diagram of image recognition in picking used tableware in

FIG. 7.

DESCRIPTION OF EMBODIMENTS

Hereinafter, an automatic dish serving system, a restaurant, an automatic system for a restaurant, an automatic dish serving method, a program, and a storage medium according to embodiments of the present invention will be described with reference to drawings. However, embodiments described below exemplify an automatic dish serving system, a restaurant, an automatic system for a restaurant, an automatic dish serving method, a program, and a storage medium for embodying the technical concept of the present invention. The present invention is not limited thereto, and can be equally applied to those of other embodiments included in the claims.

First Embodiment

Figure 1:
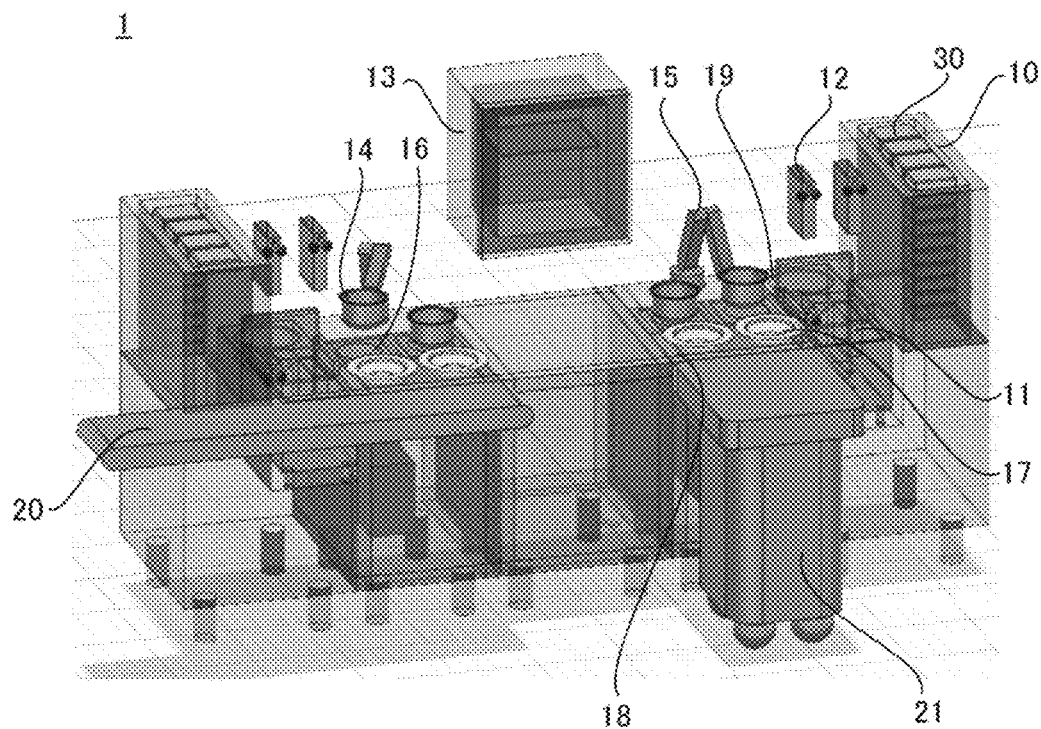
FIG. 1 is a perspective view of an automatic dish serving system 1 of the first embodiment.
Figure 2:
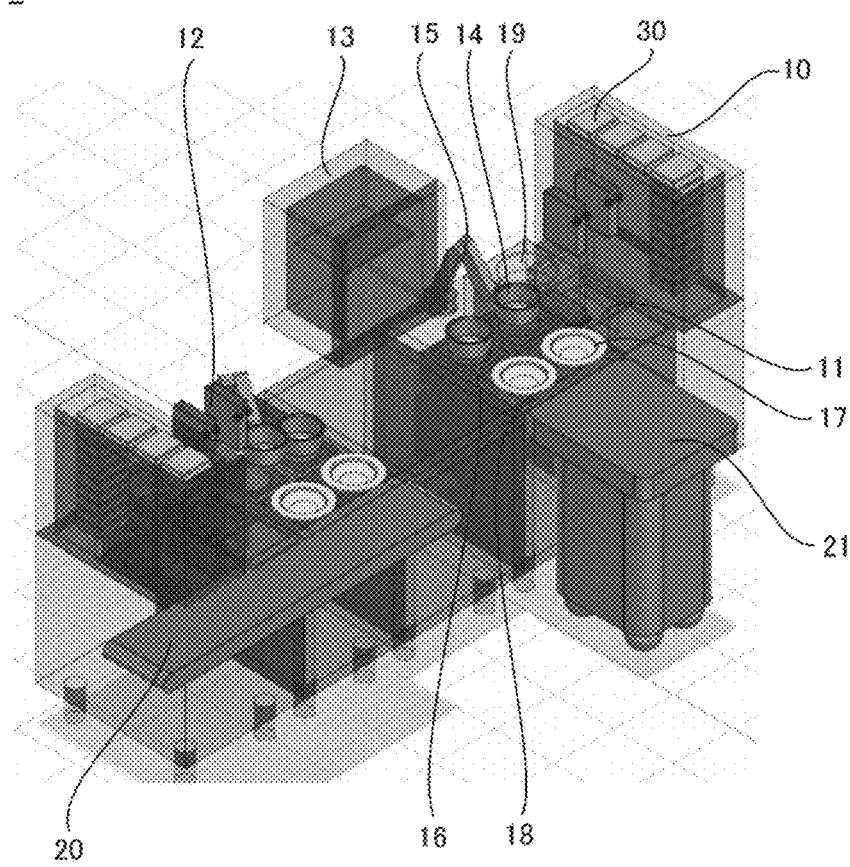
FIG. 2 is a perspective view from another angle in FIG. 1.
Figure 3:
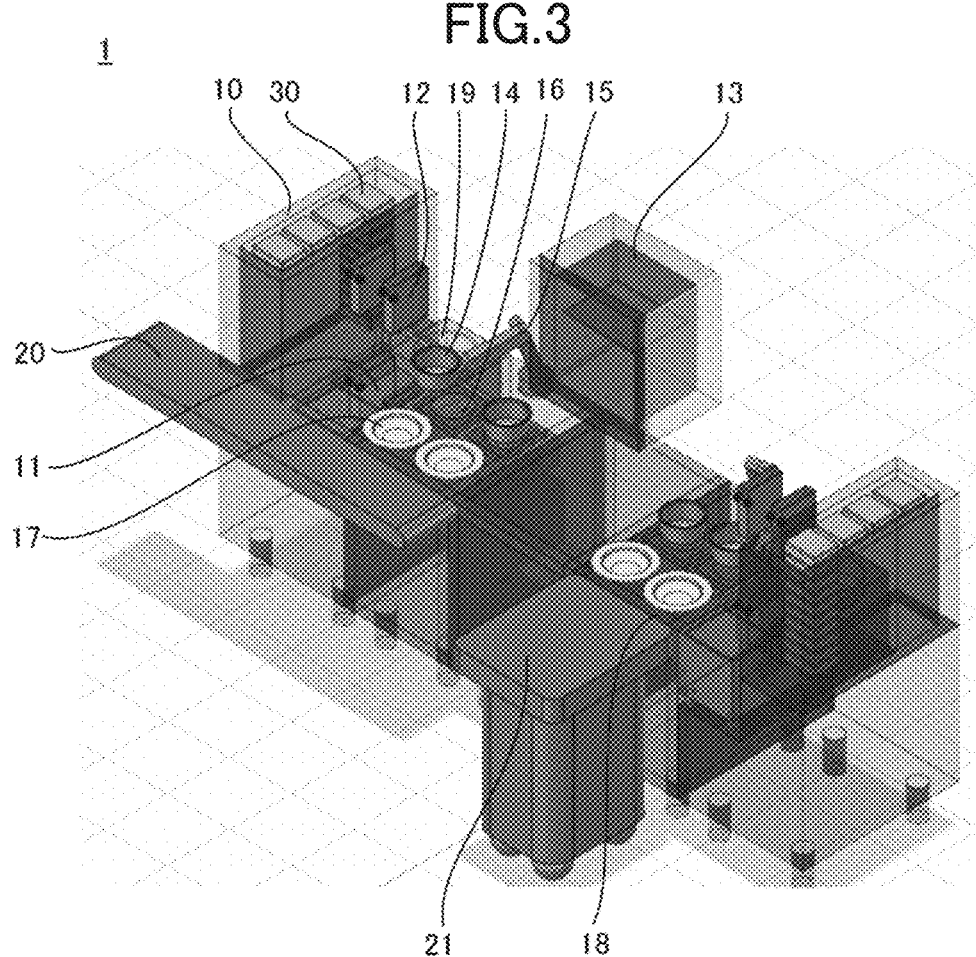
FIG. 3 is a perspective view from further another angle in FIG. 1.

An automatic dish serving system 1 according to the first embodiment of the present invention will be described with reference to FIGS. 1 to 3. FIG. 1 is a perspective view of the first embodiment. FIG. 2 is a perspective view from another angle in FIG. 1. Further, FIG. 3 is a perspective view from further another angle in FIG. 1.

The automatic dish serving system 1 of the present embodiment is a system that can, according to a customer's order, supply ingredients and noodles, cook dishes, serve dishes to a customer in which food is dished up on a serving container, and wash a serving container or a cooking container. The automatic dish serving system 1 of the present embodiment can handle multiple types of noodle dishes such as pasta, ramen, champon, buckwheat noodles, udon noodles, somen noodles, nyumen noodles, hiyamugi noodles, hoto noodles, kishimen noodles, and yakisoba noodles. In the case of pasta, for example, the automatic dish serving system 1 of the present embodiment includes various types of pasta such as spaghetti, linguini, fettucine, lasagna, macaroni, and penne. Further, the automatic dish serving system 1 can also cook multiple types of dishes including sauces, soups, ingredients, recipes and the like. As described below, it can also cook dishes other than noodle dishes.

The automatic dish serving system 1 of the present embodiment includes a noodle supplying device 10, a boiler 11, a basket 12 for boiling noodles at the boiler 11, an ingredient supplying device 13, an electromagnetic cooker 16 capable of heating and cooking ingredients or noodles with a cooking container 14, a robot arm 15 as a moving device, an electromagnetic cooker 16 as a heating device, a serving container supplying device 18 for supplying a serving container 17, a washing machine 19 for washing a cooking container 14, a dish delivering conveyor 20 or an automatic dish delivering machine 21, an serving container washing machine (not shown) for washing used tableware such as serving containers 17, and the like.

In the automatic dish serving system 1 of the present embodiment, a pair of units composed of one boiler 11, which has one noodle supplying device 10 and two baskets 12, two electromagnetic cookers 16 and the serving container supplying device 18, which can provide two serving container, is provided so that they are symmetrical on both of the left and right sides of FIG. 1. Both units can share one ingredient supplying device 13, but the present embodiment is not limited thereto, and a pair of the ingredient supplying devices 13 may be provided. In the present embodiment, the electromagnetic cooker 16 is described as an example of a heating device, but the present embodiment is not limited thereto, and a heating device may be, for example, a gas cooker, an electric cooker or the like.

The noodle supplying device 10 stores at least one type of noodles 30 among various types of noodles 30 for multiple servings, and supplies noodles 30 to a basket 12. The noodle supplying device 10 stores noodles 30 in a state of being collected together for each serving, and noodles 30 are supplied to a basket 12 for each serving. In order to collect noodles 30 for each serving, for example, the temperature inside the noodle supplying device 10 can be set to the freezing temperature so that frozen noodles 30 can be stored. In this case, by matching the shape of the frozen noodles 30 with the shape of a basket 12, it becomes easy to put noodles 30 into a basket 12. When a basket 12 is at a noodle supply position from the noodle supplying device 10, noodles 30 delivered from a noodle feeding unit of the noodle supplying device 10 are put into the basket 12 in a state of being properly fitted by a noodle supplying guide (not shown) provided in the noodle supplying device 10. Here, a case where the noodle 30 is in a frozen state is illustrated, but the present embodiment is not limited to this case, and for example, the noodle 30 may be a dry noodle, a raw noodle or the like. It is also possible to provide a means for bundling noodles 30 for each serving and a means for releasing the noodles from the means for bundling noodles 30 for each serving when the noodles 30 are put into a basket 12.

Noodles 30 are collected together for each serving, and the amount of one serving can be a usual serving amount for one person. In addition, a large serving amount or a small serving amount can be also provided, and these amounts of one serving can be separately stored in the noodle supplying device 10 and a predetermined amount of noodles 30 can be taken out according to a customer's order. Further, it is possible to store multiple types of noodles separately in the noodle supplying device 10 and take out a predetermined type of noodles 30 according to a customer's order.

A basket 12 is a water-permeable basket so that noodles can come into contact with hot water in the boiler 11. The material of a basket 12 is not particularly limited, but the basket 12 is made of, for example, metal, resin, wood or the like. In FIG. 1, the shape of a basket 12 is a square pole with a bottom, but the present embodiment is not limited thereto, and may be, for example, a cylinder with a bottom or a prism with a bottom. Further, in a case where noodles are frozen noodles, the shape of a basket 12 is preferably corresponds to the shape of the frozen noodles, and in FIG. 1, from the viewpoint of storing a large number of noodles in the noodle supplying device 10, the shape of the frozen noodles is, for example, a rectangular parallelepiped shape.

A basket 12 is configured to be able to be moved up and down between a lower position where noodles are boiled in the boiler 11 and an upper position which has a height where noodles 30 are supplied from the noodle supplying device 10. The upper position can also have a height where the boiled noodles 30 are put into a cooking container 14. A basket 12 can be moved substantially horizontally in the upper position, and moved substantially horizontally among the noodle supply position from the noodle supplying device 10, a position above the boiler 11 and a position where noodles 30 are put into a cooking container 14 above the electromagnetic cooker 16. Although not particularly limited, in a case where the noodle supply position from the noodle supplying device 10, the position above the boiler 11, and the position where noodles 30 are put into a cooking container 14 above the electromagnetic cooker 16 are in a straight line, the movement of a basket 12 in the upper position is substantially horizontal movement. Here, it has been described that a basket 12 can be moved to the position above a cooking container 14 that is mounted on the electromagnetic cooker 16, but the present embodiment is not limited thereto. For example, instead of moving a basket 12, when a basket 12 is positioned above the boiler 11, a cooking container 14 can be moved by the robot arm 15 and be positioned below the basket 12 to put noodles in the basket 12 into the cooking container 14. In the present embodiment, a robot arm 15 (for example, an articulated robot arm, see FIG. 1) has been illustrated as a moving device, but the present embodiment is not limited thereto. For example, the moving device may be a moving device sliding along a rail, a moving device having a telescopic arm, a moving device that can be raised and lowered, a moving device having a plurality of actuators, or the like.

In order to put noodles 30 from a basket 12 into a cooking container 14, for example, the basket 12 is tilted above the cooking container 14 to turn the open end of a basket 12 downward so that noodles in the basket 12 can be poured into the cooking container 14. Further, for example, in a case where the bottom of a basket 12 is controlled to be opened and closed, by controlling the bottom of the basket 12 to be opened above a cooking container 12, noodles 30 in the basket 12 can be put into the cooking container 12. In a case where a basket 12 is moved substantially horizontally to a position above a serving container 17, noodles 30 in the basket 12 can be directly put into the serving container 17.

Here, as an example of the device for heating noodles, a boiler 11 has been described, but in the present embodiment, the device for heating noodles is not limited to the boiler 11. For example, it may be a steamer (not shown), a stewer or the like. The intended use of the boiler 11 is not only to boil noodles, but also to boil vegetables, dumplings and various other ingredients. If a basket 12 can be moved to an ingredient supplying port of the ingredient supplying device 13, a basket 12 can receive a predetermined amount of a predetermined ingredient from the ingredient supplying device 13 according to a customer's order, and the ingredient can be cooked in the boiler 11 for a predetermined time. Further, the electromagnetic cooker 16 can also be used for cooking other than noodle dishes. By placing a cooking container 14 on the electromagnetic cooker 16, various dishes such as fried dishes, stewed dishes, baked dishes, and heated dishes can be cooked in addition to noodle dishes, and thus various dishes can be served.

The boiler 11 can set the boiling time by moving a basket 12 up and down. The boiling time is automatically set according to the type of noodles (pasta, ramen, buckwheat noodles, udon noodles), the condition of noodles (frozen, dried noodles, raw noodles, etc.) and the amount of noodles (normal serving, large serving, small serving, etc.). In FIG. 1, the boiler 11 is illustrated as accommodating two baskets 12 at the same time, but the number of baskets 12 is not particularly limited, and may be only one or three or more. In FIG. 1, the number of baskets 12 that can be put into the boiler 11 at the same time is two, which is the same number as the number of the electromagnetic cookers 16. In the present embodiment, the boiler 11 has an accommodation space for two baskets, and each of the two baskets 12 can be accommodated in either of the two accommodation spaces of the boiler 11. Further, the two baskets 12 can be independently moved up and down and moved in the horizontal direction. Therefore, according to a customer's order, noodles 30 can be supplied from the noodle supplying device 10 to a basket 12 at an appropriate timing, and the noodles 30 supplied to the basket 12 can be boiled by the boiler 11 for a preset time. The boiling time is determined according to a customer's order. For example, in the case of pasta, the boiling time is adjusted according to the menu (recipe and cooking method). In addition, the boiler 11 is automatically adjusted regarding the temperature of hot water, the amount of hot water and the like, and the timings to exchange the hot water is automatically managed according to the cooking status, order status, noodle types, type of boiled ingredients, amounts or frequency of cooking, and the like. The work of exchanging the hot water can also be performed automatically.

Two electromagnetic cookers 16 are provided adjacent to the boiler 11, and each of them can heat a cooking container 14. A cooking container 14 is, for example, a cylindrical frying pan with a bottom. Multiple types of ingredients are stored in the ingredient supplying device 13, and ingredients according to a customer's order can be supplied to a cooking container 14. In the ingredient supplying device 13, ingredients are stored under temperature conditions suitable for the ingredients (refrigerating temperature, freezing temperature, room temperature, warming temperature). In the ingredient supplying device 13, not only solid ingredients but also sauces, soups, various ingredients, condiments, spices and the like are stored, and a predetermined amount of a predetermined ingredient is supplied to the cooking container 14 according to a customer's order. Ingredients stored in the ingredient supplying device 13 include those cooked for preparation, and these preparations are performed by a separately arranged ingredient preparation means. For example, preparations of ingredients for cooking of tomato puree, stewing soup, chopping green onion or the like can be performed by an automatic cooking machine, but for example, may be performed manually. Alternatively, ingredients prepared in another place may be stored in the ingredient supplying device 13. The ingredient supplying device 13 is provided with supply ports according to ingredients. For example, if an ingredient is a solid ingredient, the weighed amount is supplied from a supply port to a cooking container 14, and if the ingredient is, for example, a sauce or soup, a valve is provided at a supply port and the weighed amount of sauce or soup is supplied from the supply port to a cooking container 14.

In a case where ingredients for cooking of tomato puree, stewing soup, chopping green onion or the like are prepared by an automatic cooking machine, the shape and color of each ingredient, for example, tomato and green onion, are recognized with images, and the type and condition of the ingredients are grasped, and the ingredients are transported to a processing means for suitably processing the ingredients. In this transportation, it is necessary to pick up each ingredient by, for example, gripping an appropriate part of each ingredient according to the type and the state of the ingredients. For image recognition of ingredients, refer to the embodiment described later.

The control of a robot arm 15 and the control of the ingredient supplying device 13 are linked so that, before a predetermined amount of a predetermined ingredient is supplied to a cooking container 14, the cooking container 14 is moved by a robot arm 15 to a position corresponding to a supply port of the ingredient supplying device 13. A cooking container 14 to which an ingredient is supplied from the ingredient supplying device 13 is moved to the electromagnetic cooker 16 by the robot arm and cooked by heating. For example, if only a soup is to be heated, it is not necessary to stir ingredients in a cooking container 14 during heat-cooking with the electromagnetic cooker 16.

On the other hand, for example, in a case where a plurality of ingredients are fried together with a sauce or condiment, it is necessary to stir the ingredients in a cooking container 14 during heat-cooking. As one of the methods for stirring the ingredients in the cooking container 14, for example, there is a method of rotating the cooking container 14 on the electromagnetic cooker 16. In FIG. 1, the mounting surface on the electromagnetic cooker 16 for the cooking container 14 is shown as a flat surface, but the present embodiment is not limited thereto. For example, the mounting surface on the electromagnetic cooker 16 for a cooking container 14 may be a recess that matches the shape of the cooking container 14. For example, it is possible to mount a cooking container 14 in the recess with being tilted at a predetermined angle and rotationally drive the cooking container 14 with a motor or the like in the recess to stir ingredients in the cooking container 14. (In this case, the cooking container 14 rotates while the rotation axis is tilted in a predetermined direction). Further, for example, by grasping a spatula (not shown) with a robot arm 15 and controlling the robot arm, it is possible to stir ingredients in the cooking container 14 on the electromagnetic cooker 16 with the spatula.

A plurality of serving containers 17 are stored in the serving container supplying device 18, and in FIG. 1, two serving containers 17 can be provided at positions adjacent to the electromagnetic cooker 16. By gripping a cooking container 14 with a robot arm 15 and tilting it above a serving container 17, food cooked in the cooking container 14 can be dished up on the serving container 17. The serving method of the present embodiment is not limited thereto. For example, a robot arm 15 can grip a scooping utensil, and the scooping utensil can serve a cooked food in a cooking container 14 to a serving container 17. A cooking container 14 after use is carried to the washing machine 19 by a robot arm 15 and washed. A cooking container 14 after washing is taken out by a robot arm 15 and used for the next cooking.

In a case where a robot arm 15 can grip and move a serving container 17, ingredients stored in the ingredient supplying device 13 can be directly put into a serving container 17. For example, soup stored in the ingredient supplying device 13 can be poured directly into a serving container 17, and foods such as ingredients, toppings, and spices can be directly dished up on a serving container.

Upon accepting a customer's order, noodles 30 are put into a basket 12 from the noodle supplying device 10 and boiled in the boiler 11 for a predetermined time. On the other hand, a predetermined amount of a predetermined ingredient is supplied to a cooking container 14 from the serving container supplying device 18, and the cooking container 14 is cooked with the electromagnetic cooker 16. At this time, the time, at which noodle boiling is finished, and the time, at which the heat-cooking of the ingredient with the electromagnetic cooker 16 is finished, are controlled to be related to each other so that noodles that have just been boiled can be put into the cooking container 14 according to the progress of the cooking in the cooking container 14. Further, since there are two sets of units having two baskets and two electromagnetic cookers 16, four baskets and four electromagnetic cookers can be used. Thus, four dishes can be cooked in parallel. However, in FIG. 1, each unit has one robot arm 15, one noodle supplying device 10 and one washing machine 19, and one ingredient supplying device 13 is used commonly for both units. It is also necessary to consider movement paths of two baskets 12. Therefore, each device is controlled in cooperation, the priority order and the control order are adjusted, and the cooking progress of all dishes is controlled to proceed appropriately. For example, in a case of pasta dishes, in order to cook the pasta with al dente feeling, the boiling time of noodles and the heat cooking time, which is a time from the completion of boiling noodles to mixing the sauce and pasta in a cooking container 14 on the electromagnetic cooker 16, are important. Thus, priority order and sequence are determined so that these times can be managed appropriately. For example, in a case where the cooking completion times of the two electromagnetic cookers 16 overlap, start timings of boiling pasta in two baskets 12 is controlled to be shifted considering time for a robot arm 15 to dish up cooked pasta on a serving container 17. It is possible to increase the number of robot arms 15, increase the number of baskets 12 that can be put in the boiler 11 at the same time, provide a movement path that allows a plurality of baskets 12 to be moved at the same time, increase the number of washing machines 19, increase the number of ingredient supplying devices, allow noodles to be put into a plurality of baskets 12 from the noodle supplying device 10 at the same time and provide a plurality of automatic dish delivering machine 21. However, it is necessary to consider problems such as the arrangement space, the cost of the system 1 and the like.

Cooking with the electromagnetic cooker 16 is not limited to cooking in which all ingredients are added at the same time. Depending on cooking menu, ingredients with long heating time can be heated first, and ingredients with short heating time can be added later. For example, in a case where the menu is pasta, ingredients and pasta sauce supplied from the ingredient supplying device 13 to a cooking container 14 are fried on the electromagnetic cooker 16, and then pasta (noodles 30) boiled with the boiler 11 is put into the cooking container 14, ingredients and pasta sauce are mixed with the pasta and dished up on a serving container 17, and if necessary, toppings are supplied from the ingredient supplying device 13 to complete a pasta dish. In the case of buckwheat noodles or udon noodles, for example, boiled noodles 30 are put into a serving container 17, and then soup heated with the electromagnetic cooker 16 or warm soup from the ingredient supplying device 13 is added to the serving container 17, and finally, ingredients, toppings and spices are placed from the ingredient supplying device 13 to complete a dish. In the case of ramen, for example, soup heat-cooked with the electromagnetic cooker 16 or warm soup supplied from the ingredient supplying device 13 is poured into a serving container 17, and noodles 30 boiled with the boiler 11 are added thereto, and finally, ingredients, toppings and spices are placed from the ingredient supplying device 13 to complete a dish.

The dish delivering conveyor 20 and the automatic dish delivering machine 21 can deliver a dish dished up on a serving container 17 to a customer who ordered the dish. For example, the dish delivering conveyor 20 can receive a serving container with a dished up dish from the serving container supplying device and deliver the dish to the dish delivering counter where a customer who ordered the dish is located. Further, the dish delivering conveyor 20 may deliver a dish to another automatic dish delivering machine (not shown), and the automatic dish delivering machine may deliver the dish to a customer who ordered the dish. Further, for example, since the automatic dish delivering machine 21 is a self-propelled type machine, it can receive a serving container with a dished up dish from the serving container supplying device and deliver the dish to a customer who ordered the dish. In a case of delivering a dish to a customer, not only a dish but also chopsticks, noodle spoons, spoons, forks, knives, wet towels, napkins or the like can be served. The timing for serving these tools is not limited to be same as the timing when the dish is delivered, and it is also possible to set the timing as the timing when a customer enters the restaurant and takes a seat.

The automatic dish serving system according to the present embodiment includes a means for accepting an order from a customer (not shown). The means for accepting an order from a customer can accept an order by, for example, accepting an interactive order, accepting an order with customized menus, accepting an order from a wireless communication terminal, accepting orders from an dedicated terminal, accepting an order with voice recognition, accepting an order with image recognition, or the like. These selections are made interactively on a mobile terminal, and the help screen can also be taken into consideration, so that a customer can easily select or input an order. For example, it is possible to accept a customized order for a customer's taste. By storing data of a customer's past orders in the system, it is possible to present a customer-specific menu, popular menu or the like to the customer at the time of ordering. For example, it is possible to provide a menu customized by a specific customer as a recommended menu or a regular menu.

Since a customer can order by wireless communication from a mobile terminal, a customer can order even from a place away from the system, for example, outside the restaurant. In a case of ordering from a remote location, the time of actual arrival at the restaurant can be entered in advance, and upon arrival at the restaurant, the customer's position is automatically determined by a simple operation or, for example, a geofence, and a dish is served.

As a method of ordering in front of the system 1, there is also a method of not using a mobile terminal 16. For example, a predetermined order reception (not shown) is provided in the system 1, and a customer's voice order can be recognized by voice recognition. When the order is accepted, a voice guide or text display such as "Your customer number is XX. We are cooking your dish now, please wait for a moment." is performed to inform a customer of a customer number and the system cooks the ordered dish. Then, the dish can be delivered to a customer who ordered the dish in front of the counter, to which the dish is to be delivered by the dish delivering conveyor 20. In addition, by displaying the customer number of the dish, a customer can recognize that the dish is ordered by himself. Further, for example, the serving container 17 may be provided with a device for being attached with an identification number. Alternatively, it is also possible to deliver the ordered dish to a seat with a customer by the automatic dish delivering machine 21.

A customer identification number is added to a serving container 17. For example, this identification number includes a barcode or the like. The automatic dish delivering machine 21 is provided with a bar code reader, and grasps a customer information at a dish delivering destination from a bar code attached to a beverage container. Since a customer has a mobile terminal, an automatic beverage serving system can grasp location information of a customer in the restaurant. As a result, the beverage delivering device can grasp the position of a table of a customer at the delivery destination from a customer information attached to a beverage container. Here, an example using a bar code reader is illustrated, but the present embodiment is not limited thereto. For example, the system 1 may be configured to transmit to the automatic dish delivering machine 21 data of a dish to be delivered.

The automatic dish delivering machine 21 is, for example, an automatic transport device capable of self-propelling in the restaurant, and can deliver a dish to a target customer's table by guiding with a guide pattern provided on the floor in the restaurant or a position information means possessed by a beverage delivering device. Further, the automatic dish delivering machine 21 can collect a used container of a customer and transport the used serving container 17 to the serving container washing machine (not shown). For example, if the automatic dish delivering machine 21 is provided with an image recognition device and a robot arm, it is possible to recognize a used container of a customer and collect the container by the robot arm. When collecting a used container, the system asks a customer for permission to collect the container, and if a customer permits, the system is desirable to notify a customer of collecting the container before collecting the container. In addition to collecting used containers 17 from a customer, chopsticks, noodle spoons, spoons, forks, knives, wet towels, napkins and the like can be also collected. The collected chopsticks, noodle spoons, spoons, forks, knives and the like are washed and dried by the serving container washing machine or another washing device, and stored in a predetermined storage means until the next serving to a customer. Wet towels, napkins and the like are washed and dried by a washing means, and stored in a predetermined storage means until the next serving to a customer. In addition to cooking, serving, collecting, washing and the like of chopsticks, noodle spoons, spoons, forks, knives, wet towels, napkins and the like can also be automated by using the automatic dish delivering machine 21 or the like.

Further, the automatic dish delivering machine 21 can accept an order from a customer without using a mobile terminal. For example, the automatic dish delivering machine 21 is provided with a predetermined order receiving means, and a customer's voice order can be recognized by voice recognition. When an order is accepted, a voice guide or text display such as "Your customer number is XX. We are cooking your dish now, please wait for a moment." is performed to inform a customer of a customer number and the order details are sent to the system 1. In the system 1, the ordered dish is cooked, and the automatic dish delivering machine 21 delivers the dish to a customer's seat.

A used serving container 17 collected by the automatic dish delivering machine 21 or a serving container 17 collected from a device (not shown) that receives a used serving container 17 from a customer is washed and dried by the serving container washing device (not shown). The washed serving container 17 is delivered to a serving container supplying device 18 by the automatic dish delivering machine 21 and stored therein. In the present embodiment, all the processes of the automatic dish serving system 1 have been described as being automated, but the present embodiment is not limited thereto. For example, it is also possible to arrange the dishing up and add toppings manually, to deliver a dish manually, to accept an order manually, and the like.

Second Embodiment

Figure 4:
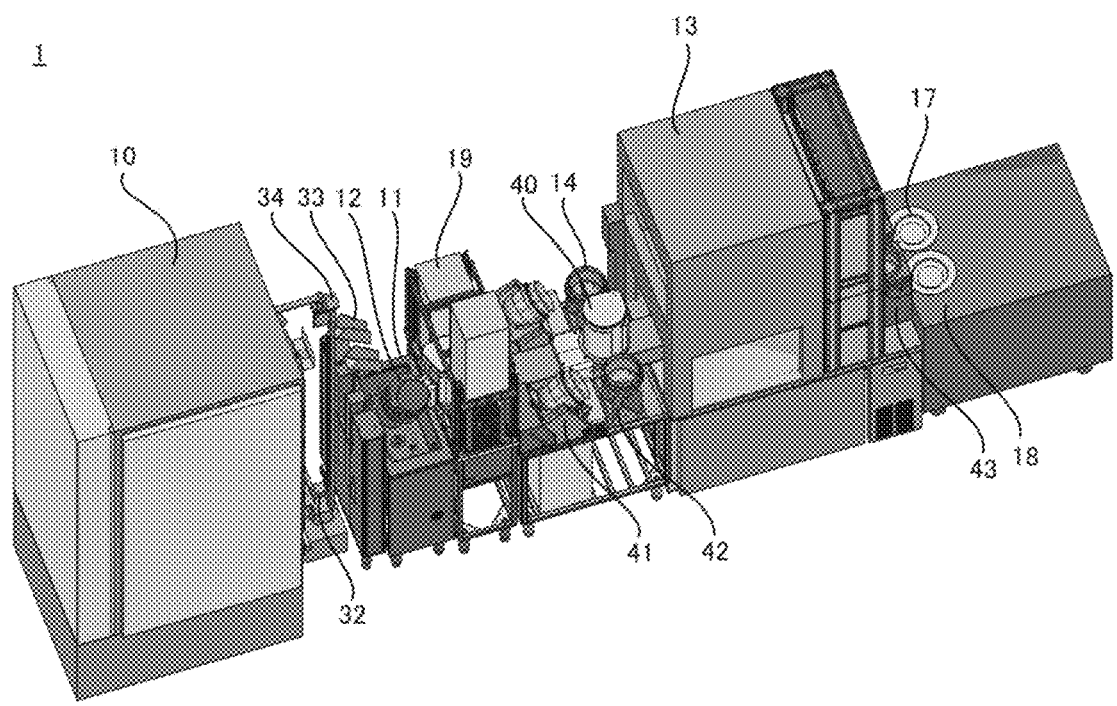
FIG. 4 is a perspective view of an automatic dish serving system 1 of the second embodiment.
Figure 5:
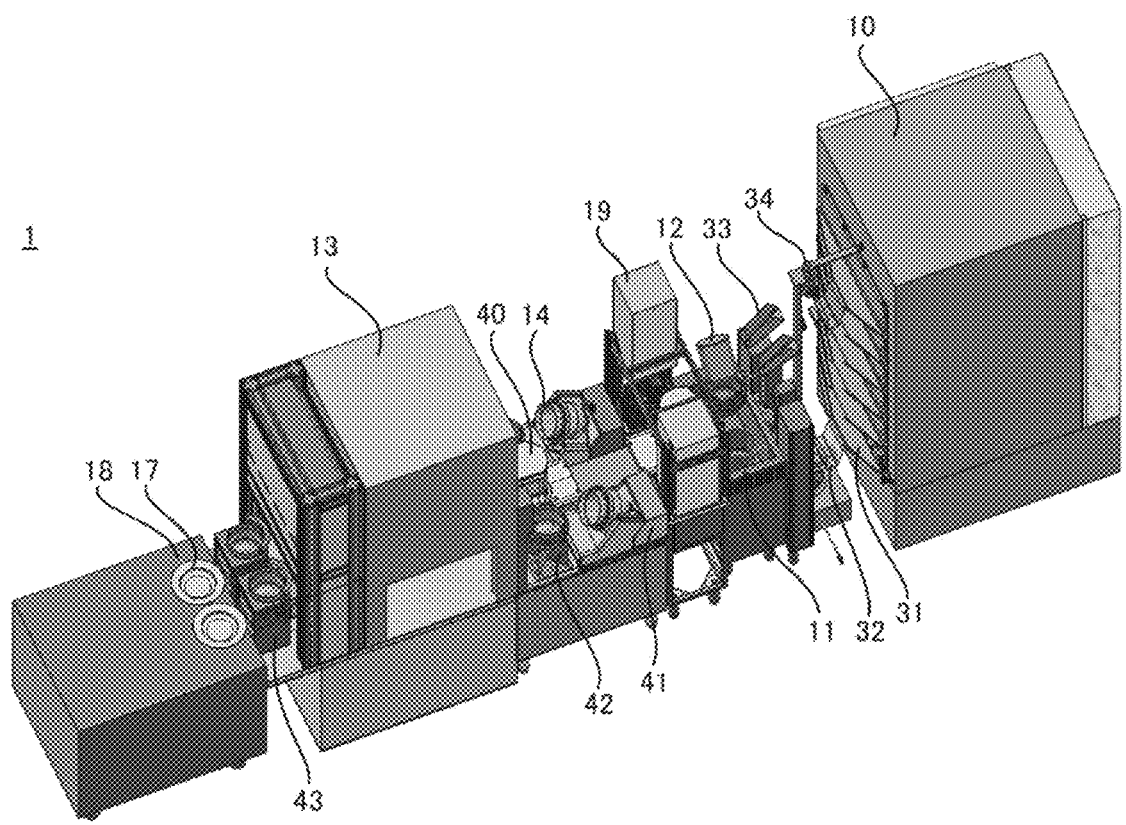
FIG. 5 is a perspective view from another angle in FIG. 4.

The automatic dish serving system 1 according to the second embodiment of the present invention will be described with reference to FIGS. 4 to 6. FIG. 4 is a perspective view of an automatic dish serving system 1 of the present embodiment. FIG. 5 is a perspective view from another angle in FIG. 4.

Similar to the first embodiment, the automatic dish serving system 1 of the present embodiment is a system that can, according to a customer's order, supply ingredients and noodles, cook dishes, serve dishes dished up in a serving container for a customer, and wash a serving container or a cooking container. Each device of the system is automatically controlled and adjusted. Similar to the first embodiment, the automatic dish serving system 1 of the present embodiment can handle multiple types of noodle dishes such as pasta, ramen, champon, buckwheat noodles, udon noodles, somen noodles, nyumen noodles, hiyamugi noodles, hoto noodles, kishimen noodles, and yakisoba noodles. In the case of pasta, for example, the automatic dish serving system 1 of the present embodiment includes various types of pasta such as spaghetti, linguini, fettucine, lasagna, macaroni, and penne. Further, the automatic dish serving system 1 can also cook multiple types of dishes including sauces, soups, ingredients, recipes and the like. As described below, it can also cook dishes other than noodle dishes.

The automatic dish serving system 1 of the present embodiment comprises, in order from the left side of FIG. 4, a noodle supplying device 10, a boiler 11, a washing machine 19 for washing a cooking container 14, a heat cooking device 41 capable of heat-cooking ingredients or noodles on a cooking container 14, a cooking container standby unit 42, an ingredient supplying device 13 for supplying ingredients such as meat, vegetables, sauces, and condiments to a cooking container 14, a dish up device 43 for dishing up cooked food on a serving container 17, and a serving container supplying device 18 for storing a serving container 17 and supplying a required type of a serving container 17 to a dish up position of the dish up device 43. Further, the automatic dish serving system 1 includes a cooking container gripping device 40 for gripping and moving a cooking container 14 among the noodle supplying device 10, the boiler 11, the washing machine 19, the heat cooking device 41, the cooking container standby unit 42, the ingredient supplying device 13, and the dish up device 43. A cooking container gripping device 40 also adjusts the posture of a cooking container 14.

The noodle supplying device 10 is a device for storing noodles and supplying a predetermined amount of noodles of an ordered type. The noodle supplying device 10 can store any type of noodles such as raw noodles, dried noodles, and frozen noodles. In order to set conditions such as temperature and humidity according to the type of noodles, a temperature and humidity control means is provided for the noodle supplying device 10. For example, in the case of storing frozen noodles, the noodle supplying device 10 is provided with a temperature control means capable of adjusting the temperature in the freezing temperature range. The noodle supplying device 10 can store multiple types of noodles and can adjust the amount to be taken out, and can supply a desired type of noodles in a desired amount according to a customer's order. For example, in the case of pasta, the noodle supplying device 10 can store various types of pasta such as spaghetti, linguini, fettucine, lasagna, macaroni, and penne.

In addition, regarding the amount, it is possible to correspond to a plurality of sizes such as normal serving, small serving, large serving, and special large serving. For example, in the case of frozen noodles, normal size noodles and half size noodles may be prepared and it is possible to serve one normal size noodle for normal serving, one half size noodle for small serving, one normal size noodle and one half size noodle for large serving, and two normal size noodles for special large serving. If the amount of boiled noodles for special large serving is too large due to the capacity of the boiler 11, the noodle supplying device 10 provides the normal size noodles to the boiler 11 twice and boils the noodles twice. Then, these two boiled noodles can be supplied to a cooking container 14 as one serving for special large serving noodles. It is also possible to increase the types of size of frozen noodles for one serving. Thus, large size noodles, special size noodles and the like may be prepared in addition to normal size noodles and half size noodles.

Noodles are stored in the noodle supplying device over a plurality of stages and noodles in each stage are arranged in a plurality of rows. The stored noodles are sent out to the noodle guide unit 31 one by one in order for each row. FIG. 5 illustrates a noodle supplying device having a storage space of 6 stages. For example, if noodles are supplied in order from the top stage of the storage space of 6 stages, when noodles in the top stage are exhausted, noodles in the second top stage are supplied, and then, noodles in the third top stage are supplied. In each stage, for example, noodles are sent out to a noodle guide unit 31 from the rightmost row of the plurality of rows and noodles are sent from the front of each row. Noodles sent out to the noodle guide unit 31 slide down the inclined surface of the noodle guide unit 31 and are placed on a noodle receiving unit 32. The noodle receiving unit 32 can be moved up and down to pick up noodles at the stage of the noodle guide unit 31 from which noodles are supplied.

The noodle receiving unit 32 on which noodles are placed is moved up and down by an elevating mechanism 34 to be moved to the position of a noodle supplying unit 33. At the position of the noodle supplying unit 33, the posture of the noodle receiving unit 32 is adjusted so as to send noodles to the supply unit 33. That is, the noodle receiving unit 32 rotates in the horizontal direction at a height corresponding to the noodle supplying unit 33, and after aligning the guide portion of the noodle receiving unit 32 with the position of the noodle supplying unit for supplying noodles, the noodle receiving unit 32 is adjusted so that the vertical angle of the noodle receiving unit 32 is tilted downward. Thereby, the guide of the noodle receiving unit 32 is aligned with an inclined portion provided in the noodle supplying unit 33, and noodles slide along the inclined portion and are put into a basket 12 of the boiler 11. In the example of FIG. 5, two baskets 12 are prepared, and two noodle supplying units 33 are also provided at positions corresponding to each basket.

In the boiler 11, noodles are boiled for a boiling time according to a customer's order, and the boiled noodles are transferred to a cooking container 14 in which ingredients and sauce are heat-cooked in advance. When noodles are boiled, a basket 12 is lifted upward. A cooking container 14 is positioned by the cooking container gripping device 40 at a position below the lifted basket and above a position where noodles are heated and at a position substantially at the center of the boiler 11. Next, the lifted basket 12 is tilted and noodles in the basket 12 are transferred to the cooking container 14. At this time, a position where the cooking container 14 receives noodles is adjusted according to a position where the basket 12 is lifted.

Ingredients and sauce are heat-cooked in a cooking container 14 for the time when noodles are boiled. A cooking container 14 washed by the washing machine 19 is moved in the ingredient supplying device 13 by the cooking container gripping device 40, and multiple types of ingredients and sauces are supplied from the ingredient supplying device 13 according to an customer's order. In the ingredient supplying device 13, multiple types of ingredients, multiple types of sauces, multiple types of condiments and the like are stored under appropriate temperature and/or humidity conditions. For example, the ingredient supplying device 13 includes a refrigerating device. A cooking container 14 receives a predetermined ingredient or sauce while being positioned at a position where a predetermined ingredient or sauce in the ingredient supplying device 13 is supplied by the cooking container gripping device 40.

A cooking container 14 that has received the predetermined ingredient or sauce is moved to the heating container standby unit 42 by the cooking container gripping device 40. Alternatively, if the heat cooking device 41 is vacant and there is no need to wait for noodles to be boiled, a cooking container 14 is directly moved to a cooking container receiving position of the heat cooking device 41. Two heat cooking devices 41 are provided in the present embodiment. In a case where heat cooking devices 41 aren't vacant, a case where there is time until starting time of heat-cooking and it is necessary to wait for noodles to be boiled, or a case where a cooking container 14 is handed over between the plurality of cooking container gripping devices 40, a cooking container 14 is temporarily waited or temporarily placed in the cooking container standby unit 42. For example, since moving ranges of the two cooking container gripping devices 40 in the present embodiment are determined, depending on a route where a cooking container 14 is moved, it may be necessary for the cooking container 14 to be handed over between the two cooking container gripping devices 40. In this case, one cooking container gripping device 40 can temporarily place the cooking container 14 on the cooking container standby unit 42, and the other cooking container gripping device 40 can pick up the cooking container 14 temporarily placed. It is also possible to set the moving ranges of the cooking container gripping devices 40 in an overlapping manner. Time to start heat-cooking, heat-cooking time, heating intensity in heat cooking and the like are automatically adjusted according to a customer's order.

In the heat cooking device 41, a cooking container 14 is heated by a heating means, for example, an electromagnetic heating means, while being rotated in a state of being held in a posture tilted at a predetermined angle from the vertical direction. By rotating and heating a cooking container 14, ingredients can be heated evenly, and ingredients and sauce can be appropriately mixed.

A cooking container 14 heat-cooked by the heat cooking device 41 is moved by the cooking container gripping device 40 to a noodle receiving position of the boiler 11, and boiled noodles are put into the cooking container 14. The cooking container 14 into which noodles are put is moved to the heat cooking device 41 again by the cooking container gripping device 40, and the cooking container 14 is rotated and heated, so that the boiled noodles is mixed with ingredients and sauce while being heated.

When the heat-cooking for a predetermined time is completed, the cooking container 14 is moved by the cooking container gripping device 40 to the dish up device 43 located at the end of the ingredient supplying device 13. At a predetermined position of the dish up device 43, a serving container 17 is prepared at a dish up position of the dish up device 43 by the serving container supplying device 18. The dish up device 43 can dish up cooked food to a serving container 17 by tilting a cooking container 14 at a predetermined angle. The dished up serving container 17 is served to a customer by, for example, the automatic dish delivering machine 21 (see FIG. 1). Since the operation of the automatic dish delivering machine 21 or the like is the same as that of the first embodiment, the description thereof will be omitted. In the present embodiment, two sets of dish up devices 43 are provided, and the serving container supplying device 18 can also supply a serving container 17 corresponding to dish up positions of the two sets of the dish up devices 43.

In a case where a plurality of ingredients are heat-cooked, the heating time may be different. In this case, for example, an ingredient having long heating time are first put into a cooking container 14 and heat-cooked by the heat cooking device 41 for a predetermined time. After that, an ingredient having short heating time can be added to the cooking container 14 from the ingredient supplying device 13, and heat-cooking can be further performed for a predetermined time. Further, after adding noodles to a cooking container 14, an ingredient may be supplied from the ingredient supplying device 13. The heat-cooking time, order and the like are automatically planned according to a customer's order and required ingredients.

Further, a cooking container 14 cooked in the heat cooking device 41 passes through the ingredient supplying device while being moved to the dish up device 43 by the cooking container gripping device 40. When passing through the ingredient supplying device, it is also possible to add a topping ingredient to food in a cooking container 14 from the ingredient supplying device. In the case of adding a topping ingredient, the cooking container gripping device 40 moves a cooking container 14 to a position where a topping ingredient is added by the ingredient supplying device 13.

After food is dished up by the dish up device 43, a cooking container 14 is moved to the washing device 19 by the cooking container gripping device 40. In the present embodiment, two washing devices 19 are provided. When a used cooking container 14 is set in a washing device 19 in a posture in which the accommodating surface faces downward, the lid of the washing device 19 is closed, and cleaning water ejected from a rotating nozzle in the washing device 19 washes the cooking container 14, and the cooking container 14 is rinsed by rinsing water ejected from the rotating nozzle, and further, the cooking container 14 is dried if necessary.

Various modes of drying a cooking container 14 can be selected according to the operation mode of the washing device 19. For example, in the case of hot water washing, a cooking container 14 can be naturally dried. It is also possible to blow off and remove water by blowing air as needed. Further, for example, drying with cold air or hot air is also possible.

A plurality of cooking containers 14 are provided, and for example, cooking can be performed using four cooking containers 14 at the same time. The cooking container gripping device 40 can grip and release a flange portion 45 provided on the entire outer circumference of a cooking container 14 by a pair of movable gripping claws 46. As will be described later, the cooking container gripping device 40 is self-propelled along a rail 48 (see FIG. 6), is rotatable in the horizontal direction, and is provided with a position/posture adjusting unit 47, and the gripping claw 46 is provided in the position/posture adjusting unit 47. Thus, the gripping claw 46 can adjust the position and posture of a cooking container 14 while gripping a cooking container 14. For example, the cooking container gripping device 40 can move a cooking container 14, change the orientation of a cooking container 14, move up and down a cooking container 14, and adjust the posture of a cooking container 14 for placing the cooking container 14 in the heat cooking device 41.

Figure 6A:
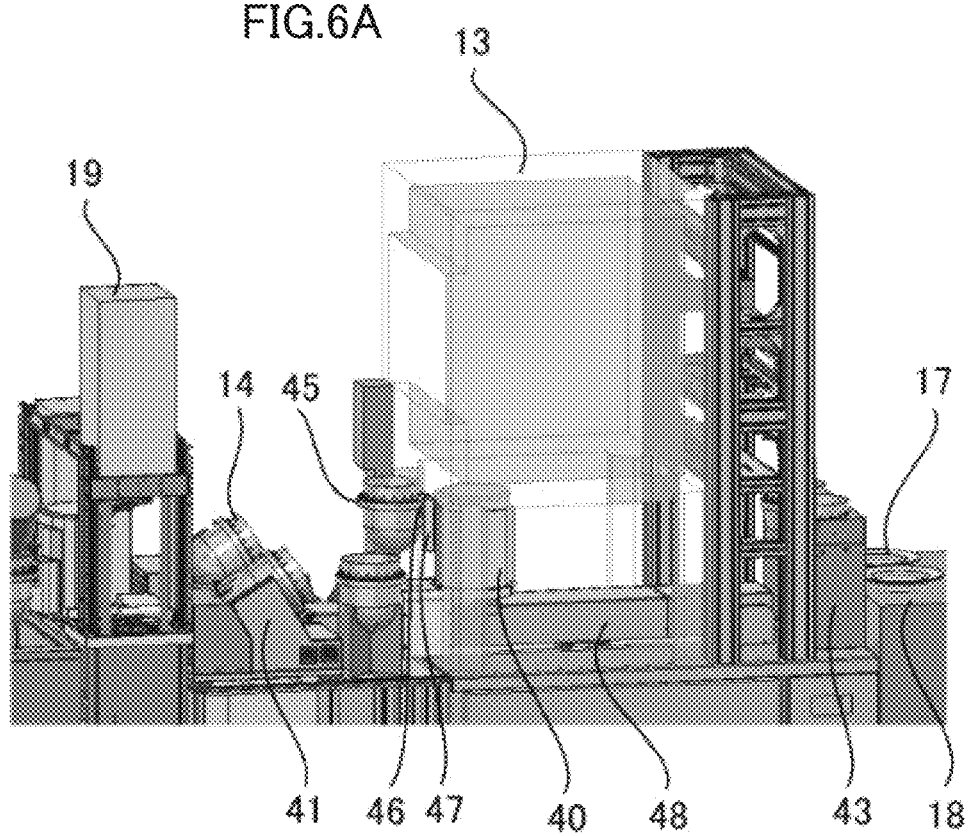
FIG. 6 is a perspective view in which outer frames and the like of the ingredient supplying device of FIG. 4 are transparently processed.
Figure 6B:
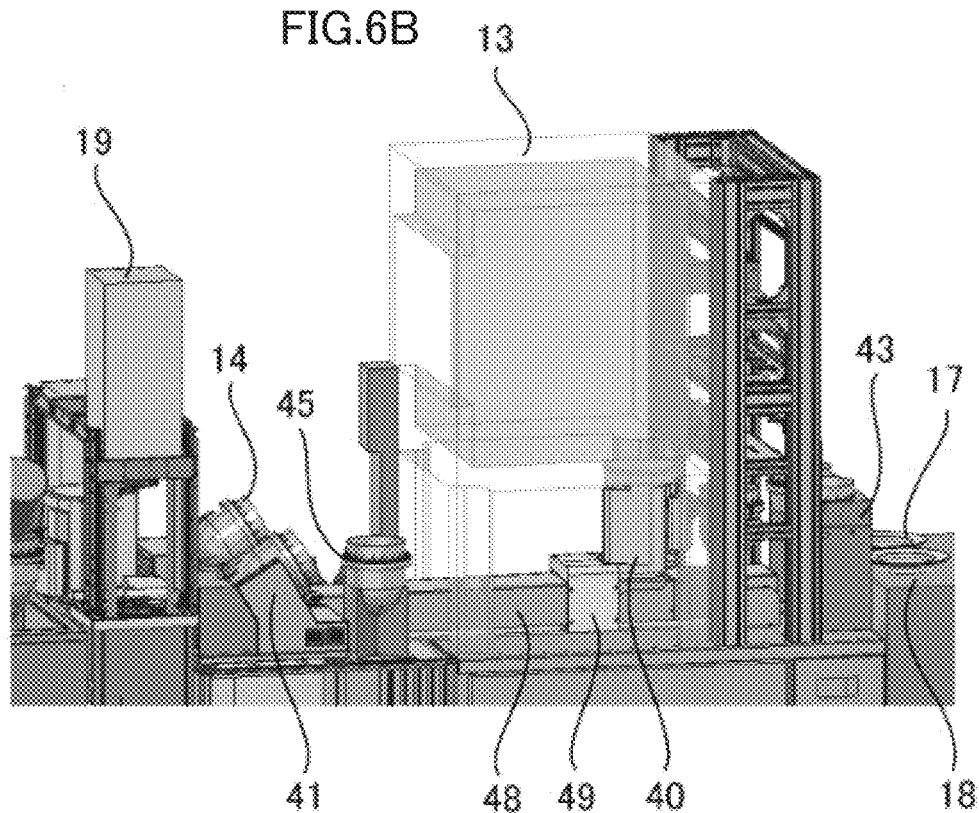

FIG. 6 is a perspective view in which outer frames and the like of the ingredient supplying device are transparently processed in order to explain the inside of the ingredient supplying device. FIG. 6A is a partial perspective view when the cooking container gripping device 40 moves a cooking container 14 to the vicinity of the cooking container standby unit 42. FIG. 6B is a partial perspective view when the cooking container gripping device 40 moves a cooking container 14 to the vicinity of the dish up device 43. Since the flange portion 45 is provided on the entire outer circumference of a cooking container 14, the cooking container gripping device 40 can grip any portion over the entire circumference of the flange portion 45 with the gripping claw 46. Therefore, the positioning control during the time when the cooking container gripping device 40 grips a cooking container 14 can be simplified. The cross section of the flange portion 45 can be, for example, L-shaped, and can be easily gripped by the gripping claw 46. The outer circumference of a cooking container 14 and the L-shaped flange form a U-shaped space that opens downward inside the flange portion 45 over the outer circumference of a cooking container 14. Further, by providing a plurality of holes in the upper surface portion of the U-shaped space, the washing water accumulated in the U-shaped space can be discharged during being washed by the washing device 19.

The cooking container gripping device 40 is configured to be able to be moved along the rail 48 by a traveling means 49. The traveling means 49 is an electric driving means that surrounds the rail 48. In the present embodiment, two cooking container gripping devices 40 are provided for one rail 48, and the two cooking container gripping devices 40 cooperate to handle a plurality of cooking containers 14. The movable range of each of the two cooking container gripping devices 40 is determined, but as described above, there may be a range in which the movable ranges overlap.

The number and arrangement of each device illustrated in the present embodiment is merely an example and does not limit the present embodiment, and the number of each device is not limited to, for example, two. That may be one or 3 or more. The number of cooking containers 14 is not also limited to four, and may be one or more, and may be five or more. Further, although the present embodiment has been described as automating all the steps of the automatic dish serving system 1, the present embodiment is not limited thereto. For example, some or all of the dish up device 43 and the serving container supplying device 18 may be performed manually. For example, it is possible to manually arrange the dishing up of food on a serving container 17 that has been dished up by the dish up device 43, or manually arrange a serving container 17 at a predetermined position. Furthermore, for example, it is possible to manually arrange the dishing up and add toppings as a finishing touch, manually deliver a dish to a customer, manually accept a customer's order, or the like.

In a system using a plurality of cooking containers 14, for example, four cooking containers 14, a plurality of ordered dishes can be cooked in parallel at the same time. In this case, it is possible to simultaneously cook a plurality of dishes ordered from a customer. The control means of the automatic dish serving system 1 automatically calculates a sequence for simultaneous cooking of a plurality of dishes. That is, which ingredient is supplied from the ingredient supplying device 13, to which cooking container 14 is supplied with the ingredient, in what order and in what temperature and how long the heat cooking device heats the ingredient, when the ordered type and amount of noodles is finished boiling with the boiler 11, when the heat cooking device heats the ingredients, and the like. According to this calculated sequence, each device of the automatic dish serving system 1 is automatically controlled in a coordinated manner.

Third Embodiment

The automatic dish serving system 1 according to the third embodiment of the present invention will be described. Although not shown in FIGS. 1 to 3 of the first embodiment and FIGS. 4 to 6 of the second embodiment, the automatic dish serving system 1 of the present embodiment includes, in addition to a boiler 11, an electromagnetic cooker 16 and a heat cooking device 41, a grill, a fryer, a roaster, a steamer, a stewer, a pressure cooker, a cooler, an oven, a microwave oven, a rice cooker or the like and can automatically serve a wide variety of dishes other than noodle dishes. Furthermore, by combining with an automatic beverage serving system, it is possible to automatically prepare beverages including alcoholic beverages, hot beverages, cold beverages and the like, and to pour them into containers and automatically serve them to a customer. Collecting and washing of tableware such as a used container can also be automated by the same means as collecting means of a used serving container 17 described above.

Fourth Embodiment

An automatic restaurant according to the fourth embodiment of the present invention will be described. The automatic restaurant of the present embodiment is provided with at least one automatic dish serving system 1 according to any one of the first to third embodiments, can accept a dish order from a customer's mobile terminal or the like, can automatically cook a dish with a recipe and in a cooking method according to the order, and can deliver the dish to the customer. Further, in the automatic restaurant of the present embodiment, it is possible to automatically grasp seat availability in the restaurant, check vacant seats by a customer even remotely, reserve seats by a customer even remotely, order a menu by a customer even remotely, automatically serve a dish to a customer, pay a fee from a customer's terminal, automatically deliver a dish, automatically collect a serving container after use, automatically wash a serving container after use, automatically refill a serving container after wash, automatically wash a cooking container after use, automatically guide a customer to a seat in the restaurant, automatically serve a dish to a customer, automatically predict an order from a customer, automatically order for purchasing ingredients, automatically refill delivered ingredients to the supplying device, or the like.

An example using an imaging device will be described as an example of a means for automatically grasping seat availability in the restaurant. An imaging device such as a camera is installed in the restaurant to take pictures of customers' seats in the restaurant. By image recognizing the captured image, it is possible to automatically and in real time grasp the seat availability status in the restaurant. As a result, vacant seats in the restaurant can be automatically determined and vacant seat information can be reflected in a reservation system. By using this reservation system, a customer can check vacant seats in the restaurant at any time in real time and reserve a desired seat, and can also reserve a seat and order a dish at the same time. In addition, since the dish serving time can be adjusted according to the reservation time, it is possible to serve an ordered dish to a customer at an appropriate timing after entering the restaurant. As an imaging means, an appropriate means such as a black-and-white camera, a color camera, an infrared camera and a video camera may be used. In addition to image recognition using moving images, vacant seats can be determined by recognizing still images at predetermined intervals. Furthermore, by analyzing the dish served to a customer by image recognition, it is possible to grasp the pace at which a customer eats the meal. For this reason, the automatic dish serving system 1 can serve a dish at the pace of a customer's meal, and can recommend an order of additional dish (including dessert and drink) via a mobile terminal.

It is also possible to automate the guidance to a seat for a customer who enter the restaurant. In a case where a customer reserved a seat, the customer indicates the reservation number, customer code or the like issued at the time of reservation, that is, for example, holds a barcode registered in a customer's mobile terminal, a two-dimensional barcode or the like, over a reading device at the entrance of the restaurant. Alternatively, the customer performs ID code authentication by communication such as short-range wireless communication from a customer's mobile terminal. Then, the system 1 recognizes the customer. Next, since a customer's reserved seat is displayed on the customer's mobile terminal or a display device in the restaurant, the customer can recognize the seat reserved by himself. In addition, the automatic dish delivering machine 21 can be used to guide the customer to the reserved seat.

If a customer didn't make a reservation, the customer notifies the system 1 by wireless communication at the entrance of the restaurant that the customer visits the restaurant using a mobile terminal, or the customer communicates with the system 1 by communication such as short-range wireless communication from a customer's mobile terminal. By communicating with the system 1, the system 1 grasps a customer's ID, confirms the past visit history, and proposes an appropriate vacant seat to the customer using a customer's mobile terminal or the display device in the restaurant. When the customer approves the seat, a customer's seat is determined, and the customer is guided to the seat by using the mobile terminal, the display device in the restaurant, and the automatic dish delivering machine 21. Dishes can be ordered by using the customer's mobile terminal, a dedicated terminal in the restaurant or the like. In a case where there are no vacant seats, the system 1 displays waiting time on the customer's mobile terminal or the display device in the restaurant. The system 1 presents the expected waiting time, the number of people waiting or the like to the customer in this way and asks for an answer as to whether the customer waits for a seat. If the customer chooses to wait for a vacant seat, the customer will be notified of the waiting status at any time, and information such as recommended menus introduction and restaurants introduction will be provided. If the seat becomes available, according to the seat waiting order, the customer will be guided to a vacant seat as described above.

Regarding accounting, in the case of an order from a mobile terminal, payment can be made electronically from a mobile terminal. Electronic payments can be made from a customer's mobile terminal even when the order is made via a restaurant's dedicated terminal or voice recognition device. However, if the restaurant is equipped with an automatic payment device, a customer can use the automatic payment device to make payments by cash card, credit card, cash, electronic money, a prepaid card and other appropriate payment methods. If a gate is provided at the exit of the restaurant and the gate opens when a customer presents a predetermined ID, for example, presents a customer's ID by short-range wireless communication using a mobile terminal, a customer who didn't make a payment can be identified to control the opening and closing of the gate and prompt the customer to make the payment by voice or display. If a system in which customers make payments in advance is adopted, it is possible to prevent a customer from leaving the restaurant without making a payment.

Next, a means for automatically ordering for ingredients and managing inventory, and a means for automatically refilling delivered ingredients to the ingredient supplying device 13 or the noodle supplying device 10 will be described. the system 1 of the present embodiment grasps various data such as order data of all customers, order data of other restaurants, past order history data, weather data, temperature data, humidity data, calendar information, event information, crowd forecast information, and congestion status in the restaurant obtained by image recognition via an imaging means. From these information, the system 1 can predict the number of visitors to the restaurant and the order for each menu, manage the inventory of ingredients or noodles in advance, and automate the ordering for purchasing ingredients. In order to predict the number of visitors to the restaurant and the order for each menu, order data of each customer, past order history data, information from related systems of other restaurants, information from information research organizations, information on the Internet and the like may also be used, and it is possible to analyze such a large amount of information by machine learning using, for example, artificial intelligence.

The inventory of ingredients and the like corresponding to the predicted order is managed by the inventory management of the system 1 according to the contents of the order. The delivered inventory is managed at a predetermined stock location, and is appropriately supplied to the ingredient supplying device 13, the noodle supplying device 10 and the like. The refilling of ingredients or noodles to the ingredient supplying device 13 and the noodle supplying device 10 and the like can be automated by using, for example, the automatic dish delivering machine 21.

Fifth Embodiment

The automatic dish serving system 1 according to the fifth embodiment of the present invention will be described. In the present embodiment, it is described that the automatic dish serving system 1 described in the first to fourth embodiments can be applied not only to restaurants, in which seats can be reserved, but also to various forms of restaurants, food stores and the like in various manner. For example, the automatic dish serving system 1 of the present embodiment can be used in supermarkets, department stores, shops, convenience stores and the like, and for example, at a convenience store, it is possible to automatically cook dishes including fried dishes using a fryer. Further, for example, the automatic dish serving system 1 of the present embodiment can be used in banquet halls, wedding halls, event halls and the like. Further, the automatic dish serving system 1 of the present embodiment can also be used in hotels, inns, guest houses, pensions, accommodation facilities and the like. Further, for example, the automatic dish serving system 1 of the present embodiment can be used in cafeterias of department stores, food courts of shopping malls, employee cafeterias and the like. Further, the automatic dish serving system 1 can be installed in a mobile store, for example, in a vehicle, and automatic cooking can be performed while the vehicle is moving or at the destination. Further, the automatic dish serving system 1 of the present embodiment can also be used in a store that cooks and sells dishes in the store, a small store, a temporary store, a cooking factory and the like.

Further, in the automatic dish serving system 1 of the present embodiment, it is possible to automate all the processes, but some processes in the system can be manually performed. For example, processes can be manually performed such as dishing up a dish and toppings on a serving container 17, delivering a dish to a customer, guiding a customer to a seat, confirming seat vacancy and making reservations of seats, accepting a dish order from a customer and inputting the order in the system 1, refilling ingredients and noodles, preparing ingredients, ordering ingredients, managing the inventory, and washing a serving container 17.

Sixth Embodiment

The automatic dish serving system 1 according to the sixth embodiment of the present invention will be described. In the present embodiment, the automatic dish serving system 1 described in the first to fifth embodiments can be further applied to a delivery store, a delivery factory and the like. Hereinafter, an example in which the automatic dish serving system 1 of the present embodiment is applied to a delivery store will be described.

A customer orders a dish remotely using a communication device such as a smartphone and a tablet terminal through websites and the like in an ordering system of a delivery store. The website of the delivery store discloses dishes along with information such as recommended dishes, popular dishes and cooking recipes. A customer can not only select these disclosed dishes, but also specify a recipe of a dish and a cooking method (baking time, boiling time, etc.). Furthermore, if a customer's past order history and customer preference data are registered in the ordering system on the delivery store side, or if a customer registers these data, by using machine learning from big data such as order histories from many customers under various past conditions and order histories at related stores, it is possible to propose recommended dishes, recommended recipes, recommended cooking methods and the like to a customer on the basis of customer information and the condition at the time of the order such as season, date and time, weather, region, related event information and the like.

When the ordering system of the delivery store accepts dish information and delivery destination information from a customer, the system notifies the customer of the information on scheduled delivery time together with information for confirming the ordered dish. The ordering system of the delivery store is linked with a delivery system of the store and/or a delivery system operated by others. When the ordering system of the delivery store accepts an customer's order, the ordering system arranges the delivery of the dish to a delivery destination specified by a customer and notifies the customer of delivery information including scheduled delivery time together with the contents of the ordered dish. The delivery information can include delivery route and delivery person information. In a case where the scheduled delivery time is changed by a predetermined time, for example, 5 minutes or more because of the progress of cooking, road conditions and the like, it is possible to notify the customer of the change of the delivery time.

In a case where the delivery store accepts a customer's order via the ordering system, the above-mentioned automatic dish serving system 1 automatically cook dishes based on a customer's order while comprehensively judging the season, date and time, weather, purchasing status, condition of purchased ingredients, status of other orders and the like at that time. Further, if customer information is registered in the system, the system automatically cooks a dish according to a recipe and a cooking method suitable for a customer in consideration of customer's preference information and the like. Since the ordering system may accept orders for a plurality of different dishes from a plurality of customers at the same time, by appropriately determining the cooking order, the system is set to shorten the waiting times of customers.

When the cooking of a dish ordered by a customer is completed, the dish is stored in a predetermined delivering container and automatically handed over to a delivery person reserved by the ordering system. After that, as instructed by the delivery store, the delivery person delivers the dish contained in the delivery container to the customer to a place specified by the customer through the delivery route within a time predetermined by the delivery system. By electronically paying the charges at the time when the ordering system accepts an order from a customer, cash exchange at the time of delivery becomes unnecessary. In addition, since the delivery person carries a mobile terminal, it is possible to make an electronic payment using the mobile terminal at the time of delivery. Further, since the delivery person can also use an automatic delivery system such as an automatic driving vehicle or an automatic driving drone, all processes including order acceptance, cooking, and delivery can be automated and unmanned. For food safety and traffic safety, some of this automation can be performed manually, or can be monitored manually, but even if some are performed manually, significant labor saving is possible compared to traditional delivery stores.

In the present embodiment, a delivery store is described as an example, and the present embodiment is not limited thereto. For example, it can be applied to various forms of dish delivery such as a delivery factory that is larger than a store, a delivery service in a restaurant or a cafeteria, or local sales and catering in a mobile store (for example, a vehicle equipped with an automatic dish delivery system).

Seventh Embodiment

The automatic dish serving system 1 according to the seventh embodiment of the present invention will be described. In the present embodiment, an automatic cooking machine that prepares ingredients for cooking of tomato puree, stewing soup, chopping green onion or the like is further added to the automatic dish serving system 1 described in the first to sixth embodiments. In a case where ingredients are prepared by an automatic cooking machine, the shape and color of each ingredient, such as tomato or green onion, are recognized with image, the type and condition of the ingredient are grasped, and they are transported to a processing means for suitably processing the ingredients. At the time of this transportation, it is necessary to pick up and transport an ingredient by grasping an appropriate position of each ingredient according to the type and state of the ingredient by a transport means, for example, a robot arm.

Therefore, as a means for image recognizing ingredients using images acquired by an image acquisition device and picking up the ingredients with a robot arm, an example, in which the outer shape of a tomato and the shape of the calyx are image-recognized and the tomato is picked up by a robot arm from the direction of the calyx, will be described. The image acquisition device is not particularly limited, but a camera capable of acquiring a two-dimensional image, for example, a two-dimensional color image, is used. As an image input device, a camera capable of acquiring a stereoscopic image such as a stereo camera may be used, but here, as an example of using an inexpensive camera, a case where a camera capable of acquiring a two-dimensional image is used will be described.

In order to recognize an ingredient from a two-dimensional image, a neural network is used to output a plurality of information such as the type of an ingredient, the outline of the ingredient, and the characteristic area of the ingredient from a two-dimensional image. For example, in the case of a tomato, information such as the outer shape of the tomato and the shape and position of the calyx as a characteristic area is output. As image recognition, for example, the type of an object (hereinafter referred to as "label") and the outer shape of the object (contour mask image) can be output from a known two-dimensional image such as Mask-RCNN.

In the image recognition device of the present embodiment, this Mask-RCNN is further developed to obtain a mask image of not only the outer shape of the object but also the characteristic area of the object. That is, in the case of a tomato, it is possible to output the outline of the tomato, the type of the tomato, and the mask image of the calyx of the tomato. Unlike the case where the outer shape of the object and the characteristic point of the object are simply learned separately, the outer shape of the object and the partial area in the outer shape of the object are learned and recognized as a unit. Thus, it is possible to obtain a mask image in which the boundaries of the object are clear.

For this purpose, a plurality of data, which includes an image of the object, an area of the object and a label, and a known shape as the shape of the characteristic area are given to the image recognition device in advance. In the example of a tomato, images of tomatoes, areas (contours) of tomatoes, and types of tomatoes are given, and a general shape of tomato calyx is given to Mask-RCNN in advance. Further, since the center position of the tomato calyx with a general shape is clear, the center position of the tomato calyx can be obtained by calculation from the mask image of the tomato calyx. Alternatively, the center position of the tomato calyx may be output by providing the image recognition device with information on the center position of the calyx of the general tomato in advance.

Here, the so-called model data is not given to the image recognition device in advance, but tomatoes of various types, colors and sizes can be recognized because data on a general tomato is learned.

As an algorithm for solving the three-dimensional position/posture relationship between an object and a camera by giving information on the correspondence relation between pixels in a two-dimensional image and positions in the three-dimensional coordinate, for example, a method called Solve Perspective-n-Point (Solve PNP), which is a known Open Computer Vision Library (omitted as "OpenCV"), can be adopted. By combining SolvePNP with the Mask image output by the Mask-RCNN described above, it is possible to obtain an image recognition device that estimates the position and posture of an object using only a two-dimensional image without using a three-dimensional camera or the like. In the case of a tomato, the position and posture of the tomato can be calculated from the outer shape of the tomato and the mask image or center position of the tomato calyx.

When viewed from the direction of the tomato calyx (hereinafter referred to as "front"), the tomato has a substantially circular shape or a substantially rotationally symmetric shape on the two-dimensional image. However, when viewed from a direction other than the front, the two-dimensional color image does not appear to be circular or rotationally symmetric, and the center position of the tomato calyx appears to deviate from the center of the tomato contour. The image recognition device of the present embodiment calculates how such a known feature looks on a two-dimensional image to determine the direction in which the object is located as seen from the image acquisition device (position of the object) and how the object is tilted (the posture of the tableware).

Generally, the position of an object output by image processing is inaccurate in the optical axis direction (depth direction) of the camera, and the distance in the depth direction cannot be estimated unless the dimensions of the object are known in advance from the model data of the object. Since the image recognition device of the present embodiment is used without a model as described above, it is difficult to accurately calculate the distance from the image acquisition device to the object. Therefore, in the present embodiment, a method for estimating the position and orientation of an object without a model using an image recognition device and for picking up the object will be described below.

A robot arm is moved to an object in a orbit that runs along the straight line connecting the origin of the camera coordinate system and the object so as to run along the optical axis direction of the image acquisition device, for example, a two-dimensional camera. For example, a robot arm is moved along the straight line connecting the origin of the camera coordinate system and the center of the tomato calyx while maintaining the posture in which the axis of a gripping member of the robot arm coincides with the straight line passing through the center of the tomato and toward the tomato calyx (hereinafter this straight line is referred to as "tomato center axis"). In this case, it is necessary to avoid the situation where it is impossible to move the robot arm on the planned orbit because the axis of the robot arm rotates to the limit or the robot arm takes a peculiar posture depending on the position and posture. Therefore, the robot arm is controlled under the condition that, the posture operability of the gripping member of the robot arm is ensured above a certain level on the path to the pickup destination, the rotation amount of each axis of the robot arm is small, and the like.

A grip sensor, for example, a contact sensor, is provided on the gripping member of the robot arm. When the gripping member of the robot arm grips an object, the contact sensor reacts to determine that the pickup is successful, the robot arm is pulled up, and the object is transported to a transport position. As described above, in a case where the image recognition device recognizes an image with a two-dimensional image without a model, the distance from the image acquisition device to the object cannot be calculated accurately, but the robot arm is driven to the height at which the object is expected to be mounted. if the gripping member of the robot arm reaches the height of a mounting surface on which the object is mounted, the robot arm is pulled up to a standby position as a pickup failure. The height of the mounting surface on which the object is mounted is a parameter that a robot arm driving device grasps in advance. As a result, the image recognition device of the present embodiment can use a two-dimensional image and estimate the position and posture of the object even in a state where the model image is not registered (without a model) and can pick up the object.

In the present embodiment, a two-dimensional color image is used, and in addition to the color and shape of the entire tomato, it is also possible to determine the freshness and ripeness of the tomato in addition to the type of tomato from the mask image of the tomato calyx. In order to estimate the type, freshness and ripeness of the tomato, machine learning, for example, image recognition using deep learning or the like can be adopted. From the information on the estimated tomato type, freshness and ripeness, it is possible to further determine processing methods of the tomato by calculation.

The case where a tomato is picked up by a robot arm is described above as an example. However, the image recognition device of the present embodiment similarly uses two-dimensional images for various objects other than tomatoes, and estimates the position and orientation of the objects even in a state where no model image is registered (without a model). Based on this estimation, the object can be picked up by a robot arm. For example, if the object is a long onion, the image recognition device of the present embodiment can output a plurality of information such as the type of the long onion, the outer shape of the long onion, and the mask image of the white portion of the long onion as the characteristic area of the long onion. This allows the information obtained by the image recognition device to be used for processing such as grasping and picking up the central part of the white portion of the long onion with a robot arm or cutting only the white portion of the long onion.

Eighth Embodiment

The automatic dish serving system 1 according to the eighth embodiment of the present invention will be described. In the present embodiment, a system in which an automatic tableware washing system is further added to the automatic dish serving system 1 described in the first to seventh embodiments will be described. In order to save labor in a restaurant, it is necessary not only to automate the delivering of dishes, but also to automate the collecting used tableware, the washing of tableware, and the storing of washed tableware. The image recognition device described in the seventh embodiment can also be used when handling these tableware. Here, an example of handling tableware with the above-mentioned image recognition device, in particular, a system in which tableware is put into a washing machine, taken out of the washing machine, and stored in a container for each type of tableware will be described.

In the seventh embodiment, in order to pick up a tomato with a robot arm, the image recognition device recognizes the tomato calyx as a characteristic area. In the case of tableware, especially in the case of plates, bowls or the like, it is effective to learn the bottom rim area of these tableware as a characteristic area. That is, the image recognition device of the present embodiment is designed so that in addition to the outer shape of tableware, a mask image of the bottom rim area of the tableware can be simultaneously learned and output as a characteristic area. In the image recognition device of the present embodiment, in addition to the type of tableware and the outer shape of the tableware, the bottom rim of the tableware, which is a characteristic area in the outer shape, is learned and recognized in multitask. Thereby, the mask image of the bottom rim area can be neatly rounded.

For this purpose, a plurality of data, which includes an image of an object, an area of the object, a label and a known shape of the characteristic area are given to the image recognition device in advance. In the example of tableware, multiple sets of tableware images, tableware areas (contours), and tableware types (labels) are given for learning. Further, by comparing a bottom rim shape of a general bottom rim with a known shape (circle, square, rectangle or the like), the position and posture can be calculated by the following method. Depending on the inclination of the bottom rim of the tableware, the shape such as a circle appears to be elongated and distorted on the two-dimensional image. Using this relationship, by calculating how a known shape (for example, a circle) looks on a two-dimensional image at the time when captured by a two-dimensional camera, it is possible to estimate the direction in which the tableware is located as seen from the two-dimensional camera and how the tableware is tilted.

Here, the so-called model data is not given to the image recognition device of the present embodiment in advance, tomatoes of various types, colors and sizes can be recognized because data related to images of general tableware is learned. Since image recognition algorithm used in the image recognition device of the present embodiment may be the image recognition algorithm of the above-described seventh embodiment, detailed description of this algorithm will be omitted.

Generally, the position of an object output by image processing is inaccurate in the optical axis direction (depth direction) of the camera, and the distance in the depth direction cannot be estimated unless the dimensions of the object are known in advance from the model data of the object. Since the image recognition device of the present embodiment is used without a model as described above, it is difficult to accurately calculate the distance from the image acquisition device to the object. Therefore, in the present embodiment, a method for estimating the position and orientation of an object without a model using an image recognition device and for picking up the object will be described below.

A robot arm is moved to an object in an orbit that runs along the straight line connecting the origin of the camera coordinate system and the object so as to run along the optical axis direction of the image acquisition device, for example, a two-dimensional camera. Here, an example in which a bottom rim of tableware is sucked and picked up by a suction surface provided at the tip of a robot arm will be described. The robot arm is moved along the straight line connecting the origin of the camera coordinate system and the tableware. This straight line is an orbit of the robot arm for approaching the tableware along the optical axis direction of the two-dimensional camera to pick up the tableware.

In a case where the robot arm is moved on the straight line with maintaining the posture of the suction surface, it is necessary to avoid the situation where it is impossible to move the robot arm on the planned orbit because the axis of the robot arm rotates to the limit or the robot arm takes a peculiar posture depending on the position and posture. Therefore, the suction pads are properly used according to the swing angle around the normal line of the tableware so that the posture operability of the gripping member of the robot arm is ensured above a certain level on the path to the pickup destination, the rotation amount of each axis of the robot arm is small, and the like. That is, the robot arm can be provided with two suction pads having different orientations (for example, having 90 degrees different orientations).

When a suction sensor provided in a vacuum path in which the suction pad is evacuated reacts, the robot arm is pulled up as a successful pickup, and then the tableware is stored in a predetermined storage container or the like. Even if the depth distance is indefinite, the suction pad of the robot arm is approached to the bottom rim of the tableware until the suction pad reaches the height of a mounting surface for the tableware in order to pick up the tableware. If the suction pad of the robot arm reaches the height of the mounting surface for the tableware, the pickup is determined to be failed, and the robot arm is pulled up to a standby position. The height of the mounting surface on which the tableware is mounted is a parameter that a robot arm driving device grasps in advance. As a result, the image recognition device of the present embodiment can use a two-dimensional image and estimate the position and posture of the tableware even in a state where the model image is not registered (without a model) and can pick up the object.

If this image recognition device is applied to the pick-up of tableware washed by a tableware washing machine, it is possible to pick up tableware by bringing the suction pad provided on a robot arm into contact with the center of the bottom rim of the tableware washed by the washing machine. As a result, it is possible to pick up tableware from the washing machine or from the tableware rack in the washing machine and store the tableware in the storage container for each type of tableware.

Figure 7:
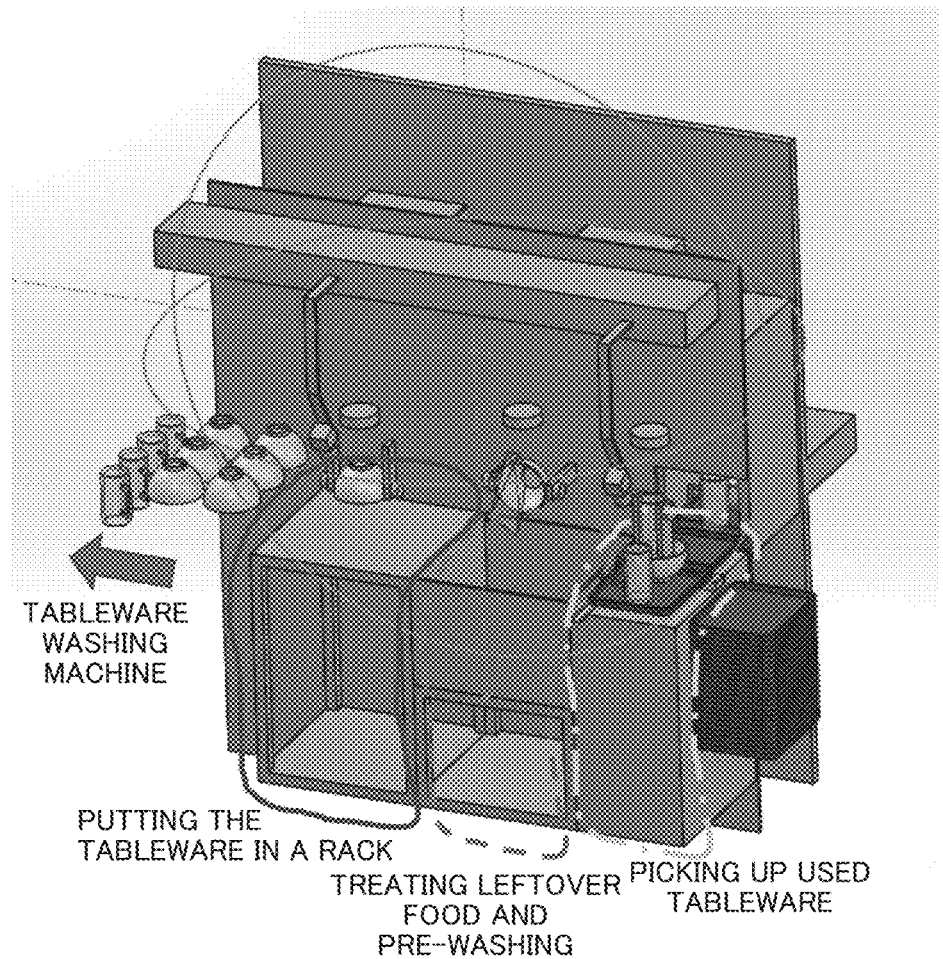
FIG. 7 is an explanatory diagram for explaining the washing of tableware by a tableware washing machine
Figure 8:
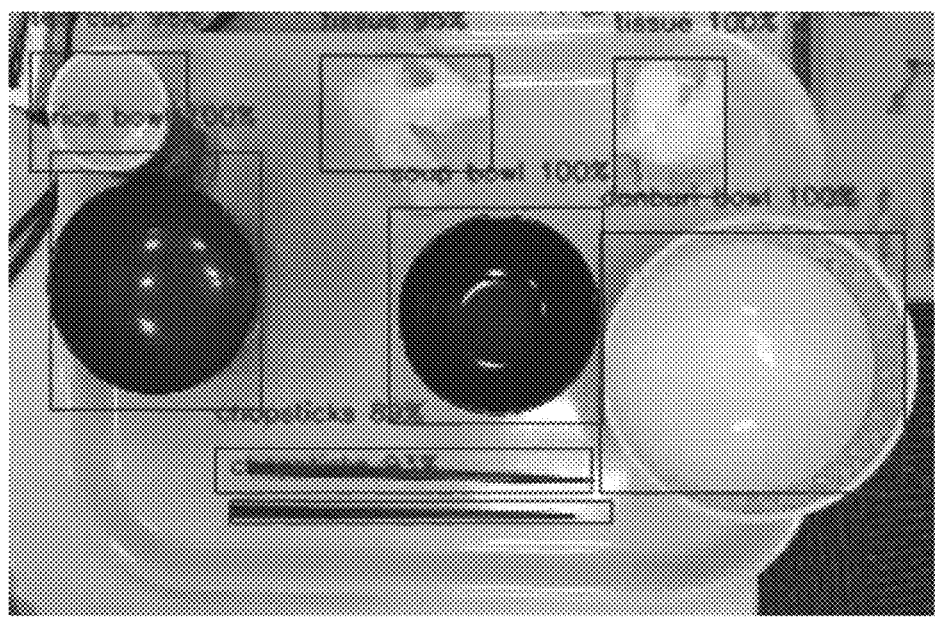

Next, an example, in which this image recognition device is applied to putting used tableware into a tableware washing machine or storing tableware in a tableware rack in a tableware washing machine, will be described with reference to FIGS. 7 and 8. FIG. 7 is an explanatory diagram for explaining the washing of tableware by a tableware washing machine, and FIG. 8 is an explanatory diagram of image recognition in picking up used tableware of FIG. 7.

As shown in FIG. 7, washing processes by the tableware washing machine include steps of (1) picking up used tableware, (2) treating leftover food and pre-washing, (3) putting the tableware in a rack, and (4) taking out washed tableware from the rack and storing them. The step of (4) is the same as the above-mentioned step of picking up a bottom rim of a tableware by a suction pad provided on a robot arm and storing the tableware in a storage container for each type of tableware. The steps of (2) and (3) are steps after the tableware is picked up by a robot arm in the step of picking up used tableware of (1), and in the steps of (2) and (3), the tableware is pre-washed in the picked state and stored in an initial rack for washing according to a predetermined rule.

Since the step (1) is a step of determining the type of used tableware, distinguishing it from dust, and picking it up by a gripping means of a robot arm, the image recognition device described in the above-described seventh embodiment can be applied to the step (1). FIG. 8 illustrates how the image recognition device recognizes the types of tableware (plates, cups, balls, chopsticks or the like) and dust (paper scraps or the like) in the step (1). As shown in FIG. 8, the image recognition device of the present embodiment can distinguish and recognize the type of tableware and dust. Therefore, based on information recognized by the image recognition device, picking up of the tableware can be controlled with an appropriate tableware gripping means of the robot arm in the step (1) of picking up used tableware.

Nineth Embodiment

The automatic dish serving system 1 according to the ninth embodiment of the present invention will be described with reference to FIGS. 9 to 18. In the present embodiment, a specific example of the ingredient supplying device will be described in the automatic dish serving system 1 described in the first to eighth embodiments. However, in the present embodiment, an example of the ingredient supplying device is shown, and the present invention is not limited to the present embodiment, and other aspects of the ingredient supplying device can also be adopted.

Figure 9:
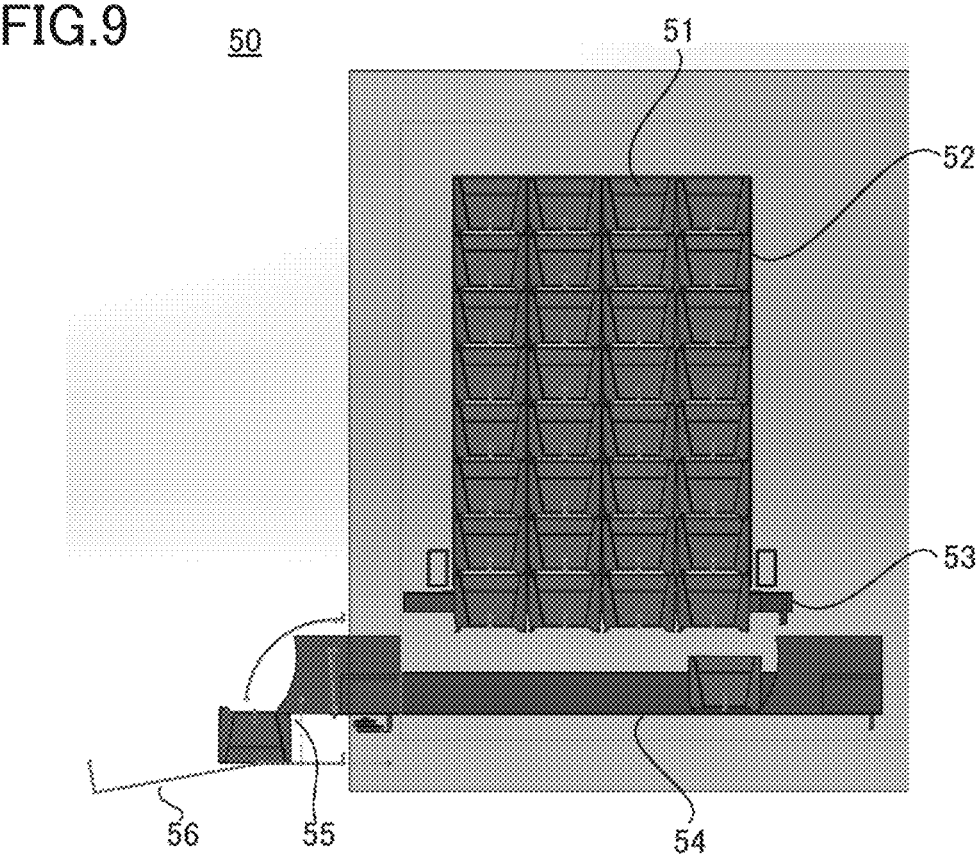
FIG. 9 is a schematic view of an ingredient supplying device.

FIG. 9 is a schematic view of an ingredient supplying device 50. The ingredient supplying device 50 includes an ingredient container stock rack 52 for storing ingredient containers 51, an ingredient container dropping device 53 for dropping a predetermined ingredient container 51 from the ingredient container stock rack 52, an ingredient container sliding device 54 for sliding and conveying an ingredient container 51 dropped from the ingredient container dropping device 53, an ingredient container taking out device 55 for taking out contained ingredients by rotating an ingredient container 51 conveyed by the ingredient container sliding device 54, and an ingredient container stocking device 56 for stocking an ingredient container 51 after taking out ingredients by the ingredient container taking out device 55.

In the ingredient container stock rack 52, ingredient containers 51 are arranged in the length direction and the width direction of the ingredient container sliding device 54, and a plurality of the ingredient containers 51 are stacked in the height direction. The entire ingredient container stock rack 52 is accommodated in a refrigerator, and the entire ingredient container stock rack 52 can be slid out of the refrigerator. The ingredient container stock rack 52 is provided with a matrix-shaped partition plate in the length direction and the width direction of the ingredient container sliding device 54, and is configured to accommodate a plurality of ingredient containers 51 in the height direction in each space partitioned in a matrix. Although not particularly limited, the ingredient container stock rack 52 can store, for example, four ingredient containers 51 in the length direction, four in the width direction, and eight in the height direction of the ingredient container sliding device 54.

The ingredient container dropping device 53 drops a predetermined ingredient container 51 stored in the ingredient container sliding device 54 onto the ingredient container sliding device 54. The ingredient container dropping device 53 can select only predetermined ingredient containers 51 from a plurality of ingredient containers 51 stored in a matrix in the ingredient container stock rack 52 and drop them one by one. A plurality of ingredient containers 51 in the ingredient container stock rack 52 can store different types of ingredient. A position, to which an ingredient container 51 containing an ingredient is refilled in the ingredient container stock rack 52, can be freely set according to the type of the corresponding menu and the like. For example, ingredient containers 51 storing the same type of ingredient can be refilled in one partition divided in a matrix. At the time of refill, the automatic dish serving system 1 determines in advance which ingredient is to be stored in which position, and ingredient containers 51 storing each ingredient are stored in a predetermined position in the ingredient container stock rack 52 as determined in advance.

The ingredient container sliding device 54 slides and conveys a predetermined ingredient container 51 dropped by the ingredient container drop device 53 to a discharge position on the left side of FIG. 9. In the ingredient container taking out device 55 at the discharge position of the ingredient container sliding device 54, an ingredient container 51 is rotated to take out an ingredient stored in the ingredient container 51, and the empty ingredient container 51 is moved to the ingredient container stocking device 56 in a state where the opening side is laid down. The empty ingredient containers 51 stocked in the ingredient container stocking device 56 are collected by an ingredient container collecting means, for example, a robot arm or the like. The empty ingredient containers 51 stocked in the ingredient container stocking device 56 may be manually collected.

Figure 10:
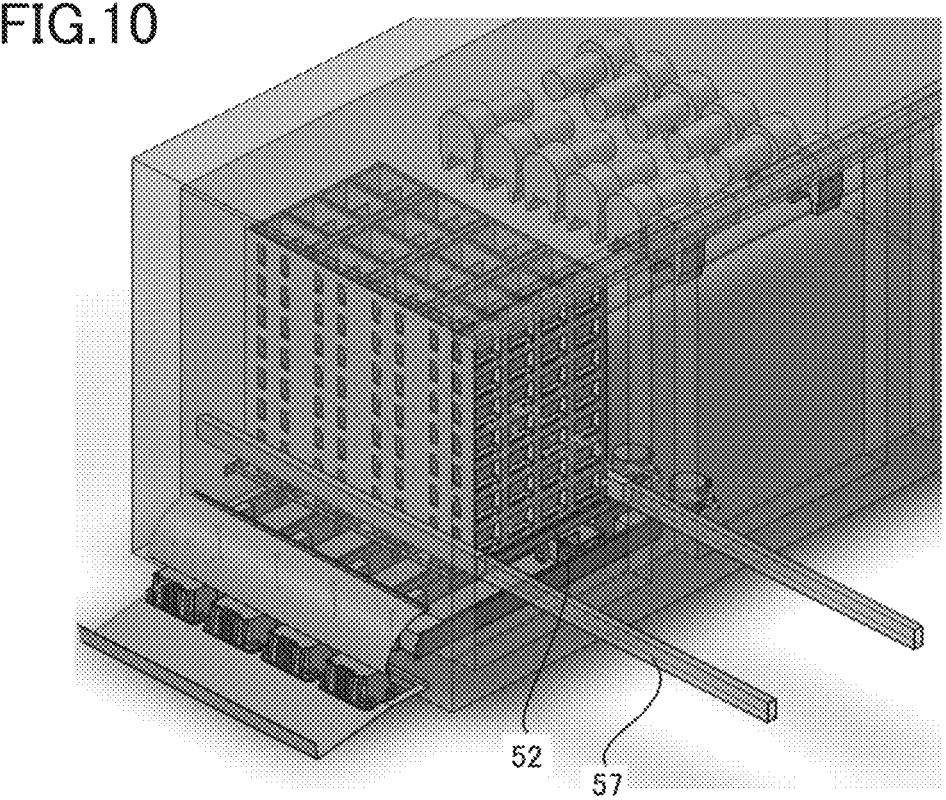
FIG. 10 is an explanatory diagram of a slide device for an ingredient container stock rack.
Figure 11A:
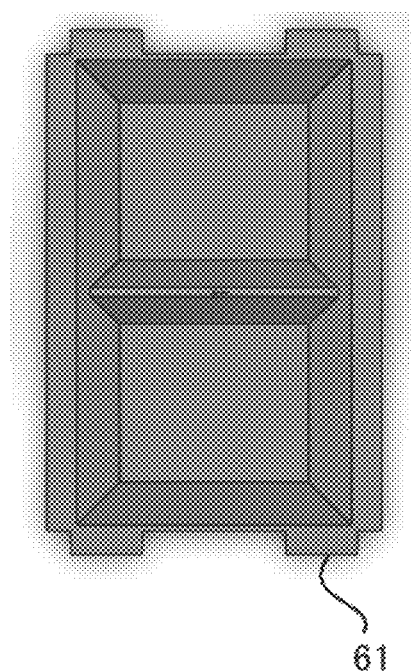
FIG. 11 is an explanatory diagram of an ingredient container.
Figure 11B:
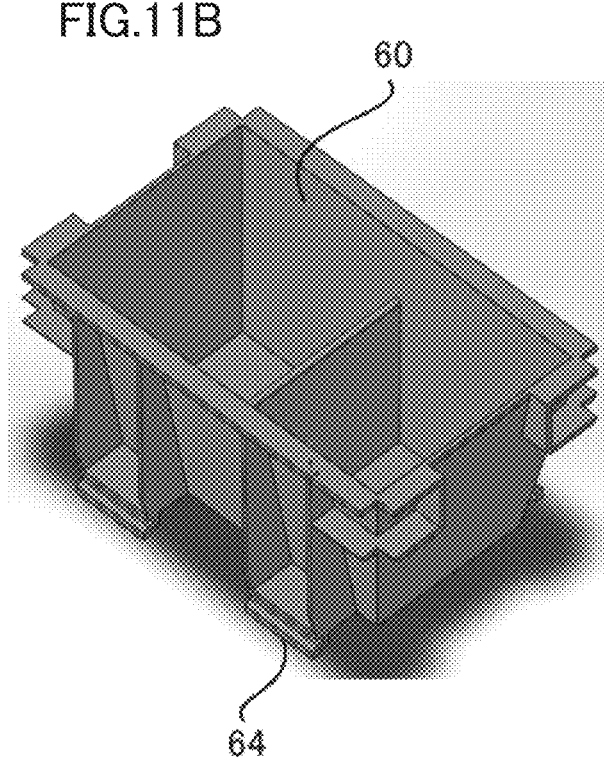
Figure 11C:
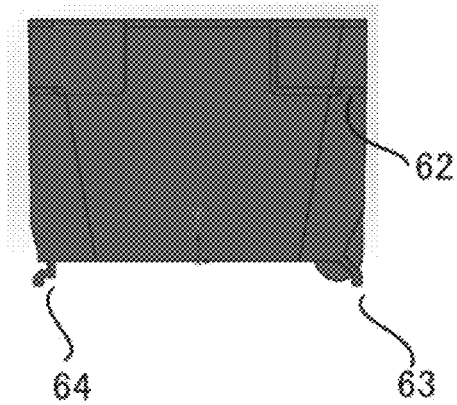
Figure 11D:
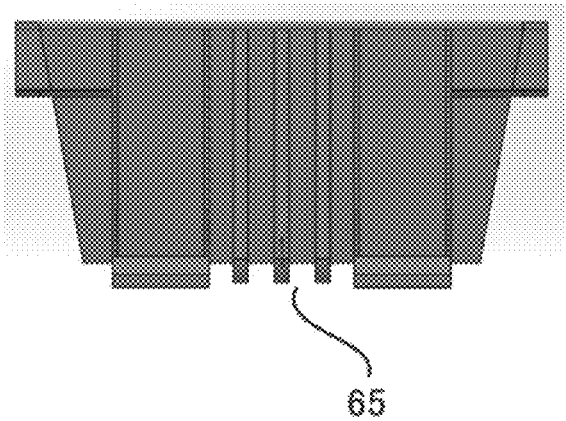

FIG. 10 is an explanatory diagram of a slide device for an ingredient container stock rack. The entire ingredient container stock rack 52 is stored in a refrigerator, and the entire ingredient container stock rack 52 can be slid out of the refrigerator by a slide device 57.

FIG. 11 is an explanatory diagram of an ingredient container. FIG. 11A is a plan view, FIG. 11B is a perspective view, FIG. 11C is a side view, and FIG. 11D is a rear view. The ingredient container 51 has an ingredient input portion 60, a fall prevention portion 61, a slide portion 62, a bottoming prevention portion 63, a rotating shaft 64 and a pressed portion 65. The ingredient input portion 60 may have a partition therein, and in the example of FIG. 11, the ingredient input portion 60 is divided into two spaces by one partition.

A pair of fall prevention portions 61 projecting laterally are provided on both side surfaces of the ingredient container 51. The ingredient container stock rack 52 is provided with a rail-shaped member that protrudes inward of each space partitioned in a matrix in the ingredient container stock rack 52 and extends in the height direction. This rail-shaped member is inserted between a pair of fall prevention members 61 projecting from both sides of the ingredient container 51, and when a tableware container 51 is refilled from above the ingredient container stock rack 52, the tableware container 51 slides along the rail-shaped member, so that the tableware container 51 does not fall freely in each space partitioned in a matrix of the ingredient container stock rack 52, and the tableware container 51 refilled from above maintains its posture and slides down smoothly.

The slide portion 62 is provided on the lower surface of the fall prevention member 61, and is designed to slide on the upper surfaces of both side walls of a slide rail 70 (FIG. 15) described later. As a result, an ingredient container 51 can slide in the ingredient container sliding device 54 while maintaining a stable posture.

For example, a pair of bottoming prevention portions 63 are provided at the lower part (lower right end of FIG. 11C) of an ingredient container 51, and when ingredient containers 51 are stacked and stocked in the ingredient container stock rack 52 in the vertical direction, an ingredient container 51 can be placed on the upper flange portion of another ingredient container 51 stored immediately below while keeping the posture of the ingredient container 51 horizontal. Further, the bottoming prevention portion 63 enables the ingredient container 51 to smoothly slide on the bottom surface of the slide rail 70.

A pair of rotating shafts 64 are provided, for example, at the lower part (lower left end of FIG. 11C) of the ingredient container 51. When the rotating shaft 64 engages with a rotating shaft engaging member 73 at the discharge position for an ingredient container 51 in the ingredient container sliding device 54, the ingredient container 51 rotates around the rotating shaft 64 and an ingredient stored in the ingredient input portion 60 is taken out downward. Further, when an ingredient container 51 is placed in the ingredient container stock rack, the rotating shaft 64 and the bottoming prevention member 63 can keep the posture of the ingredient container 51.

The pressed portion 65 provided on the rear surface of an ingredient container 51 is a portion pressed by a pressing member 72 (FIG. 15) described later. The pressed portion 65 extends in the height direction and has a plurality of concave-convex shape portions alternately provided in the width direction of the rear surface of the ingredient container 51. When the pressing member 72 presses the concave-convex shape portion, the sliding resistance between the pressing member 72 and the pressed member 65 is appropriately adjusted, and the ingredient container 51 can be smoothly conveyed on the slide rail 70 with its posture kept horizontal.

Figure 12:
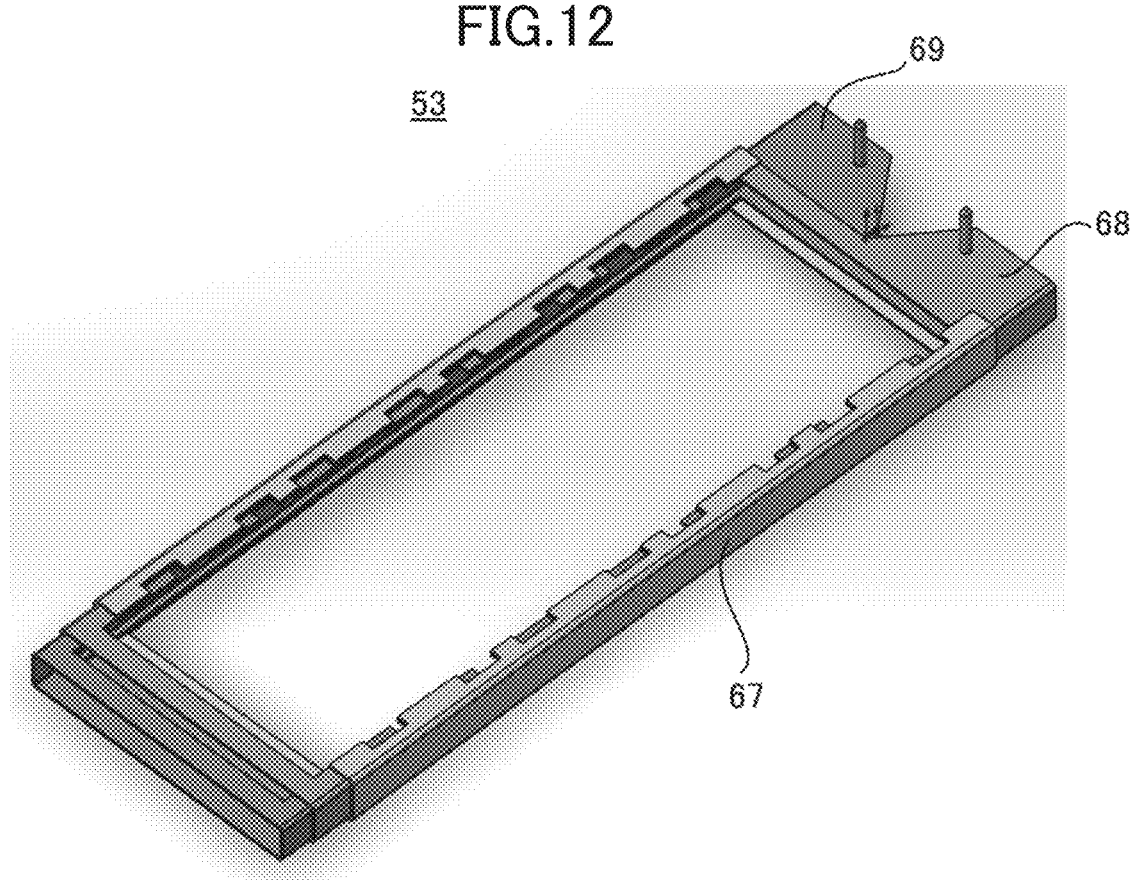
FIG. 12 is a perspective view of an ingredient container dropping device.
Figure 13A:
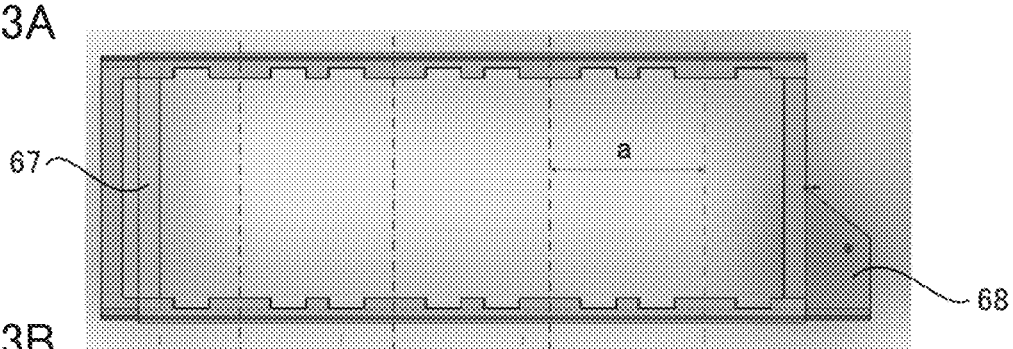
FIG. 13 is a plan view of each member of FIG. 12.
Figure 13B:
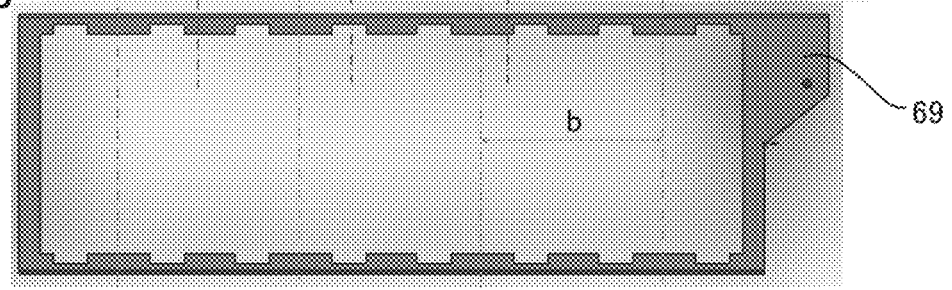

FIG. 12 is a perspective view of an ingredient container dropping device. Further, FIG. 13 is a plan view of each member of FIG. 12. The ingredient container dropping means 53 has a fixed rail 67, and a first sliding rail 68 and a second sliding rail 69 that are slidably held with respect to the fixed rail 67. A plurality of recesses having a predetermined pitch with the interval a are provided inside the upper surface of the fixed rail. A plurality of recesses having a predetermined pitch with the interval a are provided inside the first sliding rail 68. Further, a plurality of recesses having a predetermined pitch with the interval b are provided inside the second sliding rail 69.

FIG. 14 is an operation explanatory diagram of the ingredient container dropping device 53, in which an ingredient container 51 at the position of "4" is first dropped, and then an ingredient container 51 at the position of "1" is dropped. A Set of the fixed rail 67, the first sliding rails 68 and the second sliding rails 69 is provided along each slide rail 70, and it is configured so that an ingredient container 51 designated from ingredient containers 51 that are stocked at four locations on the slide rail can be dropped.

Figure 14A:
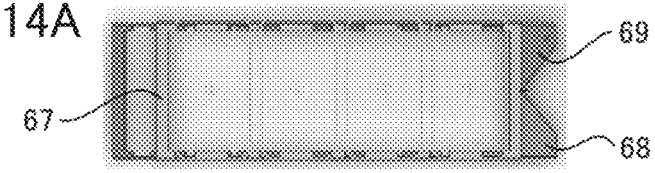
FIG. 14 is an operation explanatory diagram of FIG. 12.
Figure 14B:
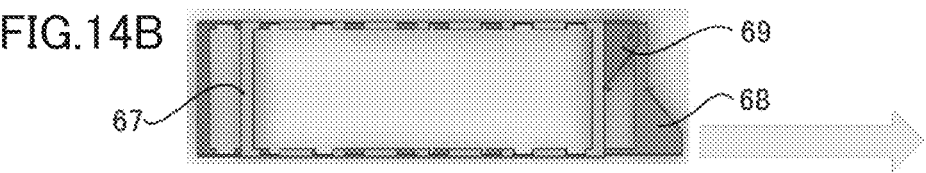
Figure 14C:
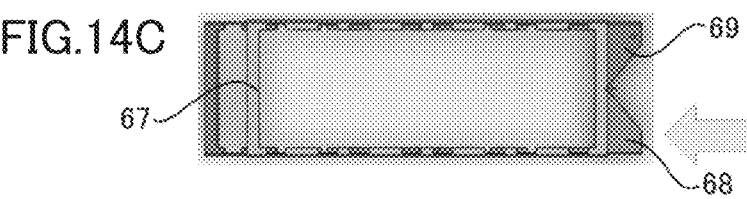
Figure 14D:
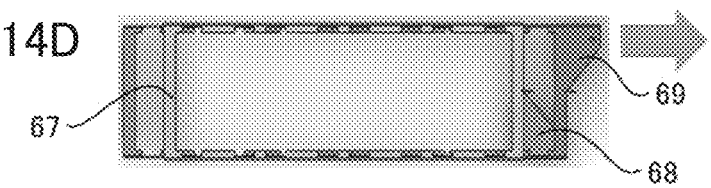
Figure 14E:
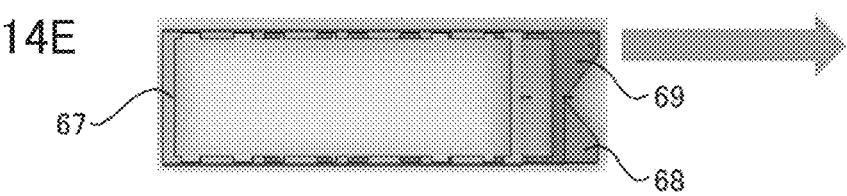

In FIG. 14A, ingredient containers 51 at all positions of "1" to "4" are fixed. In FIG. 14B, the first sliding rail 68 moves by a predetermined amount, and only one ingredient container 51 at the position "4" on the most right side drops and the first sliding rail 68 is immediately returned to a position shown in FIG. 14C. In FIG. 14D, the second sliding rail 69 moves to the right by a predetermined amount. Then, in FIG. 14E, by moving the first sliding rail 68 to the right by a predetermined amount, only one ingredient container 51 at the position "1" on the most left side falls. And immediately after that, the first sliding rail 68 is returned to a position shown in FIG. 14A, for example. By operating in this way, it is possible to take out an ingredient container 51 one by one from a designated position.

Figure 15:
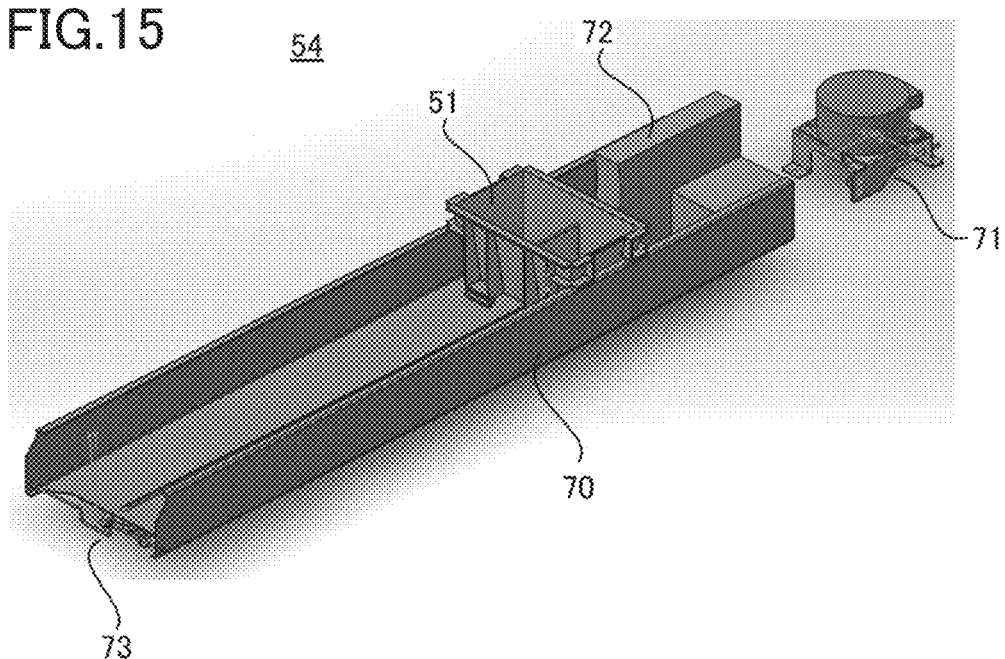
FIG. 15 is a perspective view of an ingredient container sliding device.

FIG. 15 is a perspective view of an ingredient container sliding device 54. The ingredient container sliding device 54 includes the slide rail 70, a driving force generator 71, the pressing member 72 and the rotating shaft engaging member 73. The slide rail 70 receives a dropped ingredient container and conveys it to the discharge position. The slide rail 70 has a U-shape that opens upward in cross section, and has flanges on both side surfaces (hereinafter, may be referred to as "side rails"). The lower surface of the slide portion 62 of an ingredient container 51 slidably contacts with the upper surface of the pair of flange portions. The driving force generator 71 drives the pressing member 72 to convey the dropped ingredient container 51 to the discharge position.

The slide portion 62 allows an ingredient container 51 to be conveyed along the slide rail 70 while maintaining a horizontal posture. In this transportation, the rotating shaft 64 and the bottoming prevention portion 63 provided on the lower surface of the ingredient container 51 can be set so as to be in sliding contact with the upper surface of the bottom portion of the slide rail 70. But the present embodiment is limited thereto. For example, the lower surface of the slide portion 62 of the ingredient container 51 is in sliding contact with the upper surface of the flange portion, but predetermined gaps may be provided between the rotating shaft 64 and the upper surface of the bottom portion of the slide rail 70 and between the bottoming prevention portion 63 and the upper surface of the bottom portion of the slide rail 70.

The rotating shaft engaging member 73 is a pin-shaped member provided at the discharge portion of the slide rail 70, for example, provided over the width direction, and the central portion in the width direction is bent downward in a U-shape. Both ends in the width direction are provided substantially horizontally at a predetermined height position from the bottom surface of the slide rail 70, and the rotation shaft engaging member 73 is provided so as to engage with a pair of the rotating shafts 64 of an ingredient container 51 at both ends in the width direction. Further, at the central portion in the width direction of the rotating shaft engaging member 73, there is a portion bent downward in a U-shape, and there is the positional relationship in which the pressing member 72 passes over the portion bent downward in a U-shape. Because of such a configuration, the tip end side of the pressing member 72 can advance through the discharge position of the slide rail 70 without interfering with the rotating shaft engaging member 73. Thus, by pressing the rear surface of an ingredient container 51 beyond the discharge end of the slide rail 70, the engagement between the rotation shaft 64 of the ingredient container 51 that has been rotated and becomes empty and the rotating shaft engaging member 73 is released. Then, the ingredient container 51 is moved to the ingredient container stock device 56 in a posture in which the opening side of the ingredient supplying device 60 is laid down.

FIG. 16 is an operation explanatory diagram of an ingredient container sliding device 54. In FIG. 16A, since the lower surface of the slide portion 62 of an ingredient container 51 is in sliding contact with the upper surface of the flange portion of the side rail of the slide rail 70, the posture of the ingredient container 51 can be maintained horizontally and the ingredient container 51 can be conveyed along the slide rail 70 toward the discharge position.

Figure 16A:
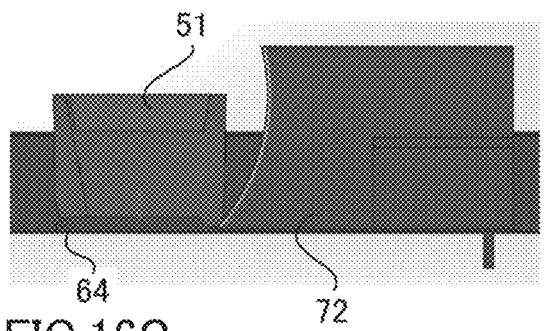
FIG. 16 is an operation explanatory diagram of FIG. 15.
Figure 16B:
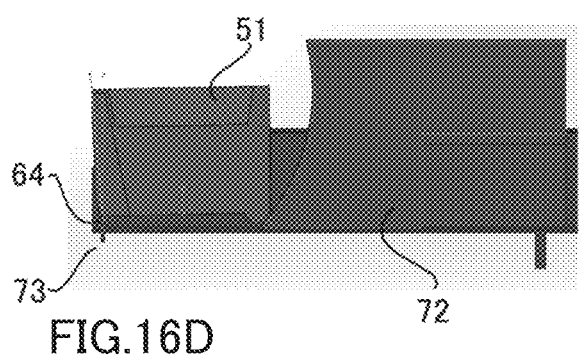

In FIG. 16B, the rotating shaft 73 on the bottom surface of the ingredient container 51 engages with the rotating shaft engaging member 73 at both ends in the width direction. Further, by being pressed by the pressing member 72, the ingredient container 51 starts to rotate around the rotating shaft 73.

Figure 16C:
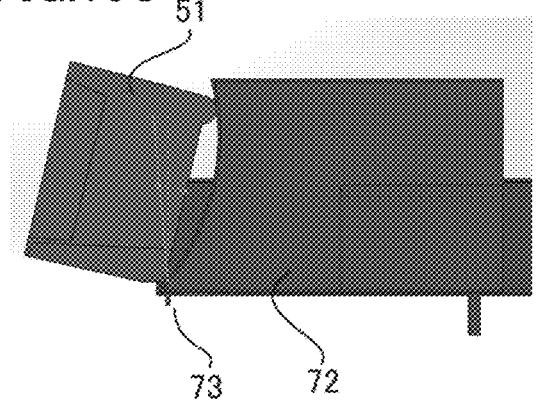
Figure 16D:
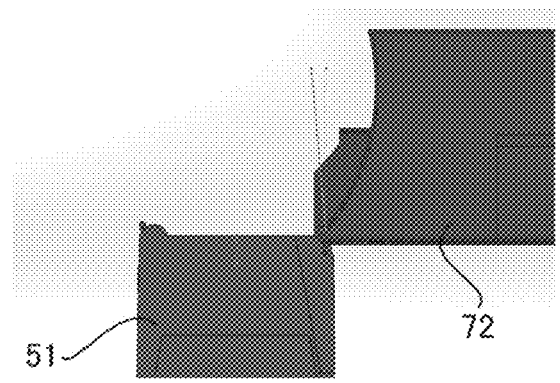

In FIG. 16C, the ingredient container 51 that has started to rotate is further pressed by the pressing member 72 to be further rotated. At this time, when the ingredient container 51 continues to rotate and the straight line connecting the position of the center of gravity of the ingredient container 51 and the rotating shaft 64 moves to the discharging side and beyond the vertical line from the rotation shaft engaging member 73 by a predetermined angle, for example, about 5 degrees. Then, the ingredient container 51 further rotates due to its own weight. After that, the ingredient container 51 rotates to approximately 180 degrees at the position shown in FIG. 16D, and an ingredient contained in the ingredient container 51 is taken out from an ingredient drop hole described later. In FIG. 16D, when the pressing member 72 further presses the ingredient container 51, the engagement between the rotating shaft 64 of the ingredient container 51 and the rotation shaft engaging member 73 is released and the ingredient container 51 is moved to a predetermined stock position of the ingredient container stock device 56 in a posture in which the opening side of the ingredient input portion is laid down.

Figure 17:
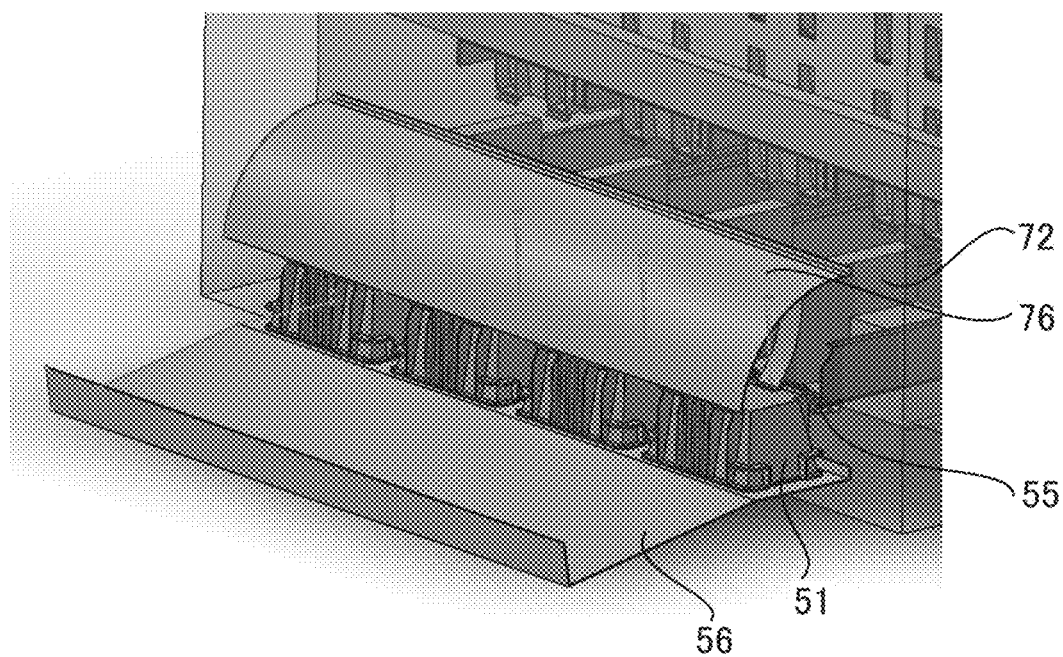
FIG. 17 is a perspective view of an ingredient container taking out device.

FIG. 17 is a perspective view of an ingredient container taking out device, illustrating a state where an ingredient container 51 is in the position of FIG. 16D. The slide rails 70 are provided in a plurality of rows, for example, four rows. A cover member 76 is provided above the discharge position of the slide rails 70. The cover member not only can prevent foreign matters from entering in, but also has a role of preventing the ingredient container 51 from rotating too much and overshooting.

Figure 18:
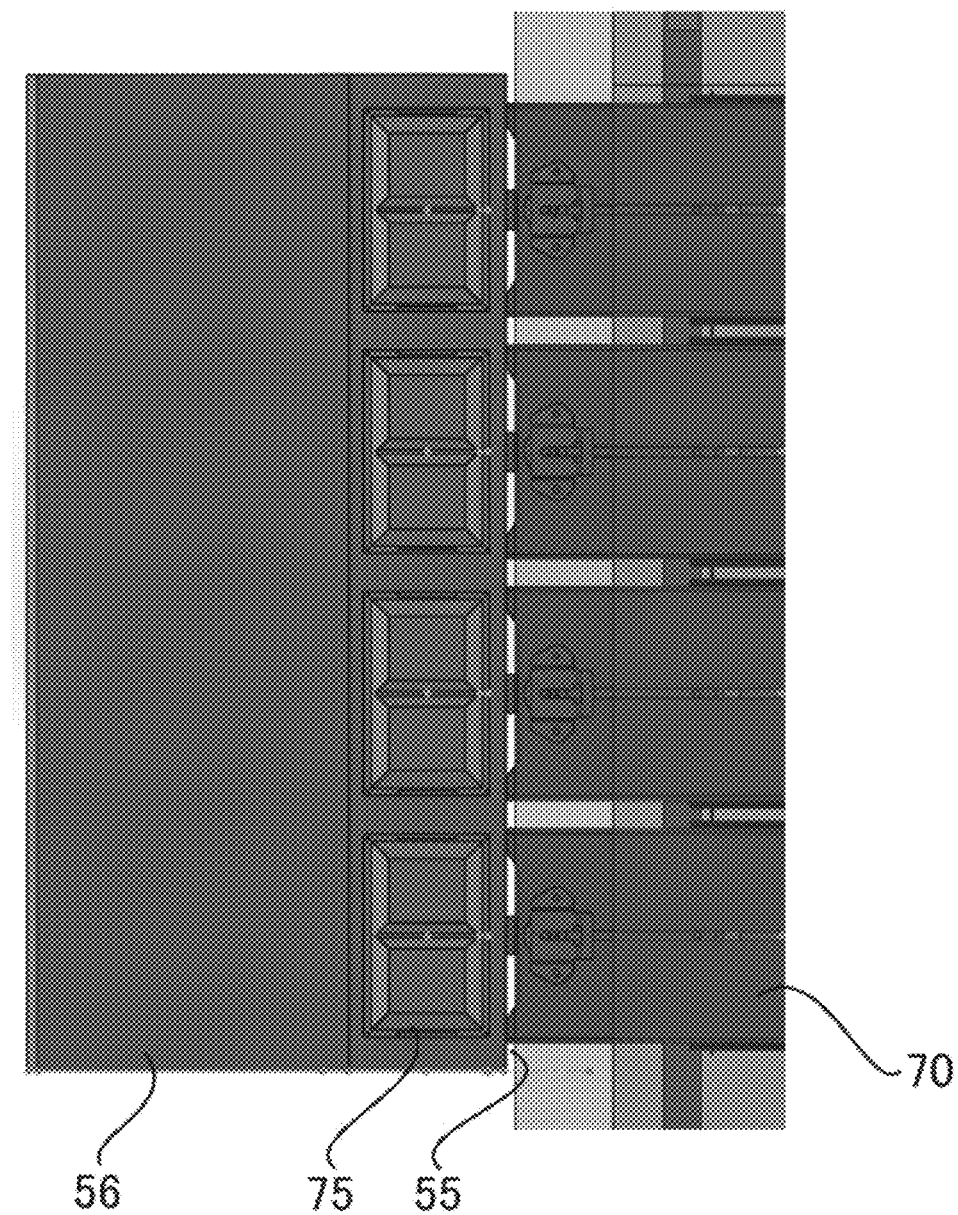
FIG. 18 is a plan view of FIG. 17.

FIG. 18 is a plan view of an ingredient container taking out device. When an ingredient container 51 is at the position shown in FIG. 16D, the ingredient drop hole 75 is provided at a position directly below the ingredient container 51, and an ingredient dropped from a rotated ingredient container 51 is put into a cooking container 14, which is conveyed to a lower position of the drop hole 75, through the drop hole 75.

In the present embodiment, an example in which four slide rails 70 are used is described, but the present invention is not limited thereto. For example, by using one slide rail 70 that can move in the width direction, the slide rail 70 can be moved according to a position where the ingredient container 51 is dropped so as to receive the dropped ingredient container 51. In this case, if the ingredient container taking out device 55 and the ingredient drop hole 75 which can move together with the slide rail 70 are used, a set of the ingredient container taking out device 55 and the ingredient drop hole 75 may be provided for one movable slide rail 70. It is also possible to use a plurality of, for example, two slide rails 70 or the like that can move in the width direction. In a case where a plurality of slide rails 70 are provided, it is possible to drop a plurality of ingredient containers 51 at the same time.

Some embodiments of the present invention have been described above. However, these embodiments are only for exemplifying an automatic dish serving system for embodying the technical concept of the present invention, and does not limit the present invention thereto. The present invention is equally applied to other embodiments, and it is possible to omit, add, or change a part of these embodiments, or to combine the aspects of each embodiment. For example, in a fully automatic system, it is possible to replace a part of the system with a manual system as needed.

REFERENCE SIGNS LIST 1 automatic dish serving system
10 noodle supplying device
11 boiler
12 basket
13 ingredient supplying device
14 cooking container
15 robot arm
16 electromagnetic cooker
17 serving container
18 serving container supplying device
19 washing machine
20 dish delivering conveyor
21 automatic dish delivering machine
30 noodles

The invention claimed is:

1. An automatic dish serving system capable of cooking multiple types of dishes according to a customer's order, wherein the system comprises at least:
   an ingredient supplying device for supplying an ingredient to a cooking container;
   a cooking container heating device for heating the cooking container;
   a cooking container washing device for washing the cooking container; and
   a moving device capable of moving the cooking container, wherein:
      the moving device can move the cooking container to at least a position at which an ingredient is supplied from the ingredient supplying device, a position at which the cooking container is heated by the cooking container heating device, or a position at which the cooking container is washed with the cooking container washing device,
      the cooking container heating device can at least heat and cook an ingredient that is supplied from the ingredient supplying device to the cooking container according to the order, and
      the cooking container is washed with the cooking container washing device and used to cook the dishes again.

2. The automatic dish serving system according to claim 1, further including a noodle heating device capable of heating noodles according to the order.

3. The automatic dish serving system according to claim 2, wherein:
   the system further includes a noodle supplying device for automatically supplying noodles to the noodle heating device,
   the noodle supplying device includes at least a noodle storing means for storing noodles at desired temperature,
   a noodle taking out means for taking out a predetermined amount of noodles from the noodle storing means, and
   a noodle transporting means for transporting noodles that is taken out by the noodle taking out means to a predetermined position in the noodle heating device.

4. The automatic dish serving system according to claim 3, wherein:
   the system includes at least the noodle supplying device, the cooking container moving device and the noodle heating device,
   the noodle supplying device automatically supplies noodles to the noodle heating device and includes:
      the noodle storing means for storing noodles at a desired temperature,
      the noodle taking out means for taking out a predetermined amount of noodles from the noodle storing means, and
      the noodle transporting means for transporting noodles that is taken out by the noodle taking out means to a predetermined position in the noodle heating device,
   the noodle supplying device takes out a predetermined amount of predetermined noodles from multiple types of noodles according to the customer's order and automatically supplies the noodles to the noodle heating device,
   the cooking container moving device includes at least one movable cooking container gripping device and moves the cooking container provided with a convex portion on the outer circumference,
   the cooking container gripping device can grip the convex portion of the cooking container, move the cooking container, and adjust the posture of the cooking container, and
   the noodle heating device for heating noodles in a basket and taking out heated noodles to the container:
      heats noodles in the basket,
      lifts the basket containing heated noodles,
      places the container at a predetermined position that is below the lifted basket and above a position at which noodles are heated, and
      tilts the lifted basket to move noodles in the basket to the container.

5. The automatic dish serving system according to claim 1, wherein:
   the moving device is composed of at least one movable cooking container gripping devices, and
   the cooking container gripping devices can at least grip and move the cooking container and adjust the posture of the cooking container.

6. The automatic dish serving system according to claim 2, wherein the system can cook noodle dishes and dishes other than noodle dishes.

7. The automatic dish serving system according to claim 2, wherein the noodle heating device and/or the cooking container heating device can cook a plurality of dishes at the same time.

8. An automatic dish serving method that is a cooking method capable of cooking multiple types of dishes according to a customer's order, the method comprising:
   supplying an ingredient to a cooking container with an ingredient supplying device;
   heating the cooking container with a cooking container heating device;
   washing the cooking container with a cooking container washing device; and
   moving the cooking container with a moving device, wherein:
      the moving device can move the cooking container to at least a position at which an ingredient is supplied from the ingredient supplying device, a position at which the cooking container is heated by the cooking container heating device, or a position at which the cooking container is washed with the cooking container washing device, and
      the cooking container heating device can at least heat and cook the ingredient that is supplied from the ingredient supplying device to the cooking container according to the order, and
      the cooking container is washed with the cooking container washing device and used to cook the dishes again.

9. A program that operates at least one step or means in the automatic dish serving method according to claim 8 with a computer.

10. A storage medium storing the program according to claim 9.

* * * * *